US008121799B2

(12) United States Patent
Terasawa et al.

(10) Patent No.: US 8,121,799 B2
(45) Date of Patent: Feb. 21, 2012

(54) LIFE ESTIMATING METHOD FOR HEATER WIRE, HEATING APPARATUS, STORAGE MEDIUM, AND LIFE ESTIMATING SYSTEM FOR HEATER WIRE

(75) Inventors: Nobutoshi Terasawa, Sapporo (JP); Minoru Obata, Nirasaki (JP); Noriaki Koyama, Oshu (JP)

(73) Assignee: Tokyo Electron Limited, Tokyo (JP)

( * ) Notice: Subject to any disclaimer, the term of this patent is extended or adjusted under 35 U.S.C. 154(b) by 867 days.

(21) Appl. No.: 12/081,404

(22) Filed: Apr. 15, 2008

(65) Prior Publication Data

US 2008/0262791 A1 Oct. 23, 2008

(30) Foreign Application Priority Data

Apr. 17, 2007 (JP) ................................ 2007-108639

(51) Int. Cl.
*G01B 3/44* (2006.01)
*G01B 3/52* (2006.01)
*G01N 37/00* (2006.01)

(52) U.S. Cl. ........................................... 702/34; 702/81

(58) Field of Classification Search .................... 702/34, 702/181

See application file for complete search history.

(56) References Cited

U.S. PATENT DOCUMENTS 5,736,655 A * 4/1998 Sekito et al. ................ 73/865.9
2005/0146709 A1* 7/2005 Oh et al. ......................... 356/72
2008/0183404 A1* 7/2008 Emami et al. .................. 702/34
2008/0208385 A1* 8/2008 Sakamoto et al. ........... 700/121

FOREIGN PATENT DOCUMENTS

JP 5-258839 10/1993
JP 10-125447 5/1998
JP 11-54244 2/1999
JP 2002-352938 12/2002
JP 2006-165200 6/2006

OTHER PUBLICATIONS

Korean Office Action issued on May 17, 2011 for Application No. 10-2008-35037 with English translation.

* cited by examiner

*Primary Examiner* — Michael Nghiem

(74) *Attorney, Agent, or Firm* — Smith, Gambrell & Russell, LLP

(57) ABSTRACT

A method of estimating the life of a heater wire, including the steps of: detecting a maximum value of electric power supplied to the heater wire during a temperature rising period during which a temperature is elevated to a preset heating temperature, obtaining an index indicative of the amplitude of the electric power, and giving a notice that the heater wire is approaching the end of its life when the electric power and the index indicative of the of amplitude of the electric power exceed threshold values respectively provided thereto.

10 Claims, 19 Drawing Sheets

LIFE ESTIMATING METHOD FOR HEATER WIRE, HEATING APPARATUS, STORAGE MEDIUM, AND LIFE ESTIMATING SYSTEM FOR HEATER WIRE

CROSS REFERENCE TO RELATED APPLICATIONS

This application is based on the prior Japanese Patent Application No. 2007-108639 filed on Apr. 17, 2007, the entire contents of which are incorporated herein by reference.

BACKGROUND OF THE INVENTION

1. Field of the Invention

The present invention relates to a life estimating method for a heater wire, a heating apparatus, a storage medium, and a life estimating system for the heater wire.

2. Background Art

As one type of semiconductor manufacturing apparatuses, a vertical type heating apparatus, in which a semiconductor wafer or wafers (hereinafter, referred to as "a wafer or wafers") are processed in a batch, has been known. For example, this apparatus includes a vertical type reaction vessel constituting a processing chamber provided with a transfer port at its bottom end, a cylindrical heat insulating member provided to surround the reaction vessel, and a heater composed of a resistance heating member provided around an inner wall face of the heat insulating member. The apparatus is configured such that multiple sheets of wafers can be carried into the reaction vessel via the transfer port while they are held by a wafer holding tool in a shelf-like fashion. In this apparatus, oxidation, film forming or the like process can be provided to the wafers, by heating the interior of the reaction vessel up to a predetermined temperature by using the heater. As the resistance heating member, a heater wire consisting of, for example, an iron-tantalum-carbon alloy or the like, can be used, and the heater wire is formed into, for example, a coil, which is wound around the reaction vessel.

Upon providing an oxidation process, annealing, film forming based on chemical vapor deposition (CVD), or film forming based on molecular layer deposition (MLD) in which growth of a layer of a predetermined film is controlled at a molecular level, or the like, to the wafers, by heating the wafers by using the heater wire as described above, the interior of the reaction vessel is adjusted at a higher temperature, for example, approximately 900° C. Meanwhile, when the wafers are carried into the reaction vessel or carried out therefrom, the interior of the reaction vessel is adjusted at a relatively low temperature, for example, approximately 650° C., for suppressing growth of a naturally oxidized film on each wafer surface, or the like reason. Because the heater wire often undergoes such severe environments that it is repeatedly brought into higher and lower temperature states, it is sometimes disconnected in a shorter period of time, depending on processing conditions.

Once the disconnection of the heater wire occurs during the heating process, all of the wafers contained in the batch will be regarded as scraps (or defective goods), increasing the lost cost and wasting the time spent for the heating process. Therefore, a technique for estimating life of the heater wire, for example, for estimating a time of disconnection, is quite important for saving the production cost of the wafers and enhancing the yield.

In the past, various techniques have been proposed with respect to the life estimation for the heater wire. For example, in Patent Document 1 as listed below, the technique for estimating the time of disconnection is discussed, in which a resistance value of the heater wire is first monitored, and the time of disconnection is then estimated based on a transition of the resistance value. In addition, in Patent Document 2 as listed below, another approach for estimating the disconnection of the heater wire is described, in which electric power supplied to the heater wire during a period of time that the temperature is stabilized (or during a stabilized temperature period), is first measured for each application (i.e., carrying in of the wafers, heating process, and carrying out of the wafers), and a transition of the standard deviation of each application is then figured.

Patent Document 1: TOKUKAIHEI No. 5-258839, KOHO

Patent Document 2: TOKUKAI No. 2002-352938, KOHO

Of course, the interior of the reaction vessel cannot reach a predetermined temperature immediately after the supply of electric power to the heater wire is started. Namely, the temperature will be elevated gradually after the start of supply of the electric power until it reaches the predetermined temperature. In this case, the electric power supplied to the heater wire will be more stabilized after the temperature reaches the predetermined temperature than during the period of time that the temperature is elevated. Accordingly, in the past, as described above, electrical data, such as the resistance value or electric power, of the heater wire, has been collected during the so-called stabilized temperature period after the heater wire reached the predetermined temperature, so as to judge conditions of degradation or deterioration of the heater wire from the electrical data obtained during the stabilized temperature period.

Although the electrical data during the stabilized temperature period will exhibit significantly greater change when the heater wire is disconnected, it will not demonstrate such great change, irrespectively of conditions of the degradation of the heater wire, until it is completely disconnected. Therefore, especially in the case of estimating the disconnection before the heater wire is actually disconnected, it is quite difficult to detect a difference between the case in which there is no degradation of the heater wire and the case in which the degradation is progressing to some extent, thus making it difficult to appropriately estimate the life of the heater wire.

As described above, if the life of the heater wire cannot be appropriately estimated, the heater wire approaching the end of its life will be suddenly disconnected during the heating process, without being detected in advance to be in such a state. In addition, there is a risk that the heater wire not yet required to be exchanged would be estimated as one approaching the end of its life, and there is possibility that such a normal heater wire would be actually exchanged with another as well.

Even though the life of the heater wire can be estimated, if a point of time of the estimation is just before the end of its life, such estimation would be too late for preparing a new heater wire to be exchanged and/or make it difficult to prepare a maintenance schedule, in advance, for the exchange. Therefore, there is a risk that the heating apparatus must be stopped for a considerably long time, as such degrading the working ratio of the heating apparatus. Accordingly, it is preferred that the disconnection of the heater wire can be estimated at a possibly early point of time.

SUMMARY OF THE INVENTION

The present invention was made in light of the above problems, and therefore it is an object of this invention to provide the life estimating method and the like for the heater wire, which can estimate the life of the heater wire, more appropriately and in an earlier period of time, upon estimating the life, in advance, before the heater wire used in the heating apparatus is disconnected.

The present invention is a life estimating method for a heater wire of a heating apparatus adapted for elevating temperature of a substrate to be processed, which is placed in a processing chamber, up to a preset heating temperature, while controlling the temperature by supplying electric power to the heater wire, as well as adapted for performing a heating process to the substrate after the temperature is elevated to the preset heating temperature, the method comprising the steps of: detecting a maximum value of magnitude of the electric power supplied to the heater wire during a temperature rising period provided for elevating the temperature up to the preset heating temperature; and performing an alarming process for giving a notice that the heater wire is approaching the end of its life when the maximum value of the magnitude of the electric power is judged to exceed a preset threshold value.

We have found that, if each heater wire is not yet disconnected, when electric power is supplied thereto, a sign of disconnection of each heater wire is more likely to appear during the temperature rising period in which the temperature is still rising and changing before reaching a predetermined temperature, than during the stabilized temperature period after it has already reached the predetermined temperature. In addition, during the temperature rising period, difference, between the case in which any one of the heater wires is degraded and the case in which none of them is degraded, can be seen more obviously. Thus, this invention is configured to estimate the life of the heater wire before it is disconnected, by utilizing data obtained during the temperature rising period. According to this invention, the life of the heater wire can be estimated more appropriately than when estimated by conventional means, by detecting the maximum value of magnitude of the electric power supplied to the heater wire during the temperature rising period and then estimating the life of the heater wire based on the detected data. Furthermore, since the sign of disconnection of the heater wire is more likely to be seen, in an earlier period, during the temperature period than during the stabilized temperature period, the life of the heater wire can be estimated in an earlier period than when estimated by conventional means.

Alternatively, the present invention is a life estimating method for a heater wire of a heating apparatus adapted for elevating temperature of a substrate to be processed, which is placed in a processing chamber, up to a preset heating temperature, while controlling the temperature by supplying electric power to the heater wire, as well as adapted for performing a heating process to the substrate after the temperature is elevated to the preset heating temperature, the method comprising the steps of: obtaining an index indicative of magnitude of amplitude of the electric power supplied to the heater wire during a temperature rising period provided for elevating the temperature up to the preset heating temperature; and performing an alarming process for giving a notice that the heater wire is approaching the end of its life when the index indicative of the magnitude of amplitude of the electric power is judged to exceed a preset threshold value.

According to this invention, the index indicative of the magnitude of amplitude of the electric power supplied to the heater wire is obtained during the temperature rising period in which the sign of disconnection of the heater wire is likely to be seen, and the life of the heater wire is estimated based on the obtained index. Consequently, the life of the heater wire can be estimated more appropriately than when estimated by conventional means.

Alternatively, the present invention is a life estimating method for a heater wire of a heating apparatus adapted for elevating temperature of a substrate to be processed, which is placed in a processing chamber, up to a preset heating temperature, while controlling the temperature by supplying electric power to the heater wire, as well as adapted for performing a heating process to the substrate after the temperature is elevated to the preset heating temperature, the method comprising the steps of: detecting a maximum value of magnitude of the electric power supplied to the heater wire during a temperature rising period provided for elevating the temperature up to the preset heating temperature as well as obtaining an index indicative of magnitude of amplitude of the electric power; and performing an alarming process for giving a notice that the heater wire is approaching the end of its life when the maximum value of the magnitude of the electric power is judged to exceed a preset threshold value with respect to the magnitude of the electric power as well as when the index indicative of the magnitude of amplitude of the electric power is judged to exceed a preset threshold value with respect to the amplitude of the electric power.

Alternatively, the present invention is a heating apparatus comprising: a processing chamber configured to elevate temperature of a substrate to be processed, up to a preset temperature, as well as configured to perform a heating process to the substrate; a heater wire provided outside the processing chamber and adapted for generating heat up to a temperature based on magnitude of electric power supplied from a power source; and a control unit adapted for controlling the electric power supplied from the power source, so as to perform temperature control using the heater wire, wherein the control unit detects a maximum value of the magnitude of the electric power supplied to the heater wire during a temperature rising period provided for elevating the temperature up to a heating temperature, obtains an index indicative of magnitude of amplitude of the electric power, and performs an alarming process for giving a notice that the heater wire is approaching the end of its life, when judging that the maximum value of the magnitude of the electric power exceeds a preset threshold value with respect to the magnitude of the electric power, and that the index indicative of the magnitude of amplitude of the electric power exceeds a preset threshold value with respect to the amplitude of the electric power.

Alternatively, the present invention is a computer-readable storage medium for storing therein a program for executing a life estimating method for a heater wire of a heating apparatus adapted for elevating temperature of a substrate to be processed, which is placed in a processing chamber, up to a preset heating temperature, while controlling the temperature by supplying electric power to the heater wire, as well as adapted for performing a heating process to the substrate after the temperature is elevated to the preset heating temperature, wherein the program is configured to drive a computer to execute the steps of: detecting a maximum value of magnitude of the electric power supplied to the heater wire during a temperature rising period provided for elevating the temperature up to the preset heating temperature as well as obtaining an index indicative of magnitude of amplitude of the electric power; and performing an alarming process for giving a notice that the heater wire is approaching the end of its life when the maximum value of the magnitude of the electric power is judged to exceed a preset threshold value with respect to the magnitude of the electric power as well as when the index indicative of the magnitude of amplitude of the electric power is judged to exceed a preset threshold value with respect to the amplitude of the electric power.

Alternatively, the present invention is a life estimating system for estimating life of a heater wire, the system including a heating apparatus and a data processor, the heating apparatus being adapted for elevating temperature of a substrate to be processed, which is placed in a processing chamber, up to a preset heating temperature, while controlling the temperature by supplying electric power to the heater wire, as well as adapted for providing a heating process to the substrate after the temperature is elevated to the preset heating temperature, and the heating apparatus and the data processor being connected with each other via a network, wherein the heating apparatus is configured to collect data of the electric power supplied to the heater wire during a temperature rising period provided for elevating the temperature up to the preset heating temperature and transmit the electric power data to the data processor via the network, and wherein the data processor is configured to perform an alarming process for giving a notice that the heater wire is approaching the end of its life, when judging that a maximum value of magnitude of the electric power data is judged to exceed a preset threshold value, after receiving the electric power data.

According to the life estimating method, heating apparatus, storage medium or life estimating system for the heater wire, related to this invention, as described above, the electric power supplied to the heater wire during the temperature rising period in which the sign of disconnection of the heater wire is likely to appear is first measured, and the life of the heater wire is then estimated, based on the maximum value and the magnitude of amplitude of the measured electric power. Thus, the life of the heater wire can be estimated appropriately.

Besides, since the estimation of the life of the heater wire can be performed, from various angles, based on the two indexes respectively indicative of the maximum value and the magnitude of amplitude of the electric power, the life of the heater wire can be estimated in an earlier period and more appropriately.

The threshold values can be set in advance corresponding to the conditions of the heating process. For instance, each threshold value can be set corresponding to the heating temperature and the time required for the temperature rising period. Alternatively or additionally, it can be set in advance corresponding to a temperature rising rate during the temperature rising period. By setting each threshold value in such a manner, the state of degradation of the heater wire can be judged more appropriately.

As the index indicative of the magnitude of amplitude of the electric power, the sums of squares of residuals of maximum values and minimum values of the electric power can be used. If doing so, the magnitude of amplitude of the electric power can be handled as a numerical value, as such the life of the heater wire can be estimated more appropriately.

Alternatively, the present invention is a life estimating method for a plurality of heater wires of a heating apparatus adapted for elevating temperature of a substrate to be processed, which is placed in a processing chamber, up to a preset heating temperature, while controlling the temperature by supplying electric power to the plurality of heater wires, as well as adapted for performing a heating process to the substrate after the temperature is elevated to the preset heating temperature, the method comprising the steps of: collecting data of electric power supplied to each heater wire, during a temperature rising period provided for elevating the temperature up to the preset heating temperature, each time the heating process is repeated; and performing an alarming process for giving a notice that the life with respect to the plurality of heater wires is approaching the end when a Mahalanobis' distance, between a center of distribution obtained, in advance, based on the distribution of the plurality of electric power data obtained when the plurality of the heater wires were all in a normal state, and the electric power data, which is an object to be measured, of the heater wires, exceeds a preset threshold value.

As the time that the heater wires were all in a normal state, it is preferred to employ, for example, a time at which none of the heater wires is degraded, for example, a time at which the heater wires are newly attached to or exchanged in the apparatus or system. However, it may also be a time at which the heater wire is used with frequency lower than a predetermined frequency defined as one before the sign of heater disconnection appears.

Alternatively, the present invention is a heating apparatus comprising: a processing chamber having a plurality of heating zones and configured to elevate temperature of a substrate to be processed, up to a preset temperature, as well as configured to perform a heating process to the substrate; a plurality of heater wires each corresponding to each heating zone and adapted for generating heat up to a temperature based on magnitude of electric power respectively supplied from a plurality of power sources; and a control unit adapted for controlling the electric power supplied from each power source, so as to perform temperature control using each heater wire, wherein the control unit collects data of the electric power supplied to each heater wire, during a temperature rising period provided for elevating the temperature up to the preset heating temperature, each time the heating process is repeated, and performs an alarming process for giving a notice that the life with respect to the plurality of heater wires is approaching the end when a Mahalanobis' distance, between a center of distribution obtained, in advance, based on the distribution of the plurality of electric power data obtained when the plurality of the heater wires were all in a normal state, and the electric power data, which is an object to be measured, of the heater wires, exceeds a preset threshold value.

According to the life estimating method and heating apparatus related to this invention, even though the plurality of heater wires are provided therein, the life of the heater wires can be estimated based on the electric power data obtained by measuring the electric power supplied to each heater wire during the temperature rising period in which the sign of disconnection of each heater wire is likely to be seen. Thus, the life of each heater wire can be estimated more appropriately than when estimated by conventional means.

By using the Mahalanobis' distance for the life estimation for each heater wire, whether or not the measured electric power data is obtained from the plurality of heater wires including the heater wire approaching the end of its life can be appropriately judged. In addition, even if the number of the heater wires is further increased, the life of these heater wires can also be appropriately estimated.

In this case, the data including the indexes respectively indicative of the maximum value of the electric power supplied to each heater wire and the magnitude of amplitude of the electric power can be used. With such data, whether or not there is the sign of disconnection of each heater wire can be appropriately judged.

According to this embodiment, the life of the plurality of heater wires can also be estimated in an earlier period and more appropriately, in the case in which a heating region due to the heater wires is divided into a plurality of heating zones along a longitudinal direction of the processing chamber, wherein each heater wire is located in each heating zone and/or in the case in which the heating region due to the heater wires is divided into the plurality of heating zones along faces of the substrate to be processed, wherein each heater wire is located in each heating zone.

Alternatively, the present invention is a life estimating method for a plurality of heater wires of a heating apparatus including a processing chamber, in which a step of carrying in a substrate holding tool holding a plurality of substrates to be processed through a substrate transfer port provided at the processing chamber, a step of elevating temperature in the processing chamber by using the plurality of heater wires provided outside the processing chamber, a step of performing a heating process to the substrates to be processed, and a step of carrying out the substrate holding tool through the substrate transfer port are repeatedly performed, the method comprising the steps of: collecting data of a maximum value of temperature with respect to the heater wire located nearest to the substrate transfer port upon carrying in the substrate holding tool through the substrate transfer port during a substrate-carrying-in step; and observing the data of the maximum value of the temperature of the heater wire located nearest to the substrate transfer port during the substrate-carrying-in step, and then performing an alarming process for giving a notice that the heater wire is approaching the end of its life when the maximum value is judged to be higher than a predetermined temperature.

Alternatively, the present invention is a heating apparatus comprising: a processing chamber having a substrate transfer port and configured to elevate temperature of a plurality of substrates to be processed, up to a preset temperature, as well as configured to perform a heating process to the substrates; a substrate holding tool configured to be optionally carried in and carried out relative to the substrate transfer port provided at the processing chamber, and adapted for holding the plurality of substrates to be processed; a plurality of heater wires provided outside the processing chamber; and a control unit adapted for controlling an amount of heat generation of the heater wires, so as to control temperature in the processing chamber, wherein the control unit collects data of a maximum value of temperature with respect to the heater wire located nearest to the substrate transfer port upon carrying in the substrate holding tool through the substrate transfer port during a substrate-carrying-in step, observes the data of the maximum value of the temperature of the heater wire during the substrate-carrying-in step, and performs an alarming process for giving a notice that the heater wire is approaching the end of its life, when judging that the maximum value is judged to be higher than a predetermined temperature.

According to the life estimating method and heating apparatus related to this invention, as described above, since the data of the temperature of the heater wire is collected during the carrying-in period for the substrates to be processed, in which the sign of disconnection of the heater wires is more likely to be seen, than during the stabilized temperature period, so as to judge whether or not there is the sign of disconnection of the heater wires based on the maximum value of the collected temperature data, the judgment can be made in an earlier period. The sign of disconnection of the heater wire located nearest to the substrate transfer port is more likely to appear as compared with the other heater wires because the temperature change of the heater wire nearest to the substrate transfer port should be greater due to each opening operation of the substrate transfer port for carrying in the substrate holding tool during the substrate-carrying-in period. Accordingly, in this invention, the data of the temperature of such a heater wire is collected, so as to judge whether or not there is the sign of disconnection of the heater wire, based on the maximum value of the collected temperature data. Therefore, the judgment can be made in an earlier period and more appropriately.

Alternatively, the present invention is a life estimating method for a plurality of heater wires of a heating apparatus including a processing chamber, in which a step of carrying in a substrate holding tool holding a plurality of substrates to be processed through a substrate transfer port provided at the processing chamber, a step of elevating temperature in the processing chamber by using the plurality of heater wires provided outside the processing chamber, a step of performing a heating process to the substrates to be processed, and a step of carrying out the substrate holding tool through the substrate transfer port are repeatedly performed, the method comprising the step of: collecting data of a maximum value of temperature with respect to the heater wire located nearest to the substrate transfer port upon carrying in the substrate holding tool through the substrate transfer port during a substrate-carrying-in step; and observing the data of the maximum value of the temperature of the heater wire located nearest to the substrate transfer port during the substrate-carrying-in period, and then performing an alarming process for giving a notice that the heater wire is approaching the end of its life when the maximum value is judged to be shifted higher than a predetermined temperature as well as judged to be in a lowering trend after the shift.

Alternatively, the present invention is a heating apparatus comprising: a processing chamber having a substrate transfer port and configured to elevate temperature of a plurality of substrates to be processed, up to a preset heating temperature, as well as configured to perform a heating process to the substrates; a substrate holding tool configured to be optionally carried in and carried out relative to the substrate transfer port provided at the processing chamber, and adapted for holding the plurality of substrates to be processed; a plurality of heater wires provided outside the processing chamber; and a control unit adapted for controlling an amount of heat generation of the heater wires, so as to control temperature in the processing chamber, wherein the control unit collects data of a maximum value of temperature with respect to the heater wire located nearest to the substrate transfer port upon carrying in the substrate holding tool through the substrate transfer port during a substrate-carrying-in period, observes the data of the maximum value of the temperature of the heater wire during the substrate-carrying-in step, and performs an alarming process for giving a notice that the heater wire is approaching the end of its life, when the maximum value is judged to be higher than a predetermined temperature, and then to be in a lowering trend.

According to the life estimating method and heating apparatus related to this invention, as described above, since whether or not the maximum value of the temperature of the heater wire during the substrate-carrying-in period is shifted higher than the predetermined temperature is judged, as well as the notice that the heater wire is approaching the end of its life is given when the maximum value is judged to be in a lowering trend after the shift, the life estimation can be performed in a more appropriate period. For instance, in the case of the heater wire that can perform a considerable number of times of the heating processes before it will be disconnected after the maximum value of its temperature is shifted, the notice that the heater wire is approaching the end of its life can be given in an appropriate period, without estimating the end of its life in an unduly early period.

In this case, a notifying process for giving a notice that there is a sign of disconnection of the heater wire may be performed at a point of time that the maximum value of the temperature of the heater wire during the substrate-carrying-in period is shifted higher than the predetermined temperature. If doing so, the notice that there is the sign of disconnection of the heater wire can be given before the notice that the heater wire is approaching the end of its life is given. Therefore, preparations for exchanging the heater wires and the like process can proceed in an earlier stage.

In the case of judging whether or not the maximum value of the temperature of the heater wire during the substrate-carrying-in period is in a lowering trend, from the data of the maximum value collected each time the substrate holding tool is carried in, the judgment may be made based on an event in which the maximum value of the heater wire is lowered in succession over a predetermined number of times or more. In this case, for example, an average of changing amounts of the maximum value of the temperature of the heater wire during the substrate-carrying-in period is first obtained from the data of the maximum value collected each time the substrate holding tool is carried in. Then, if the so-obtained average of changing amounts of the maximum value is lowered in succession over the predetermined number of times or more, the maximum value is judged to be in a lowering trend. Consequently, the lowering trend of the maximum value of the temperature of the heater wire can be accurately grasped.

As described above, according to the present invention, by utilizing the data obtained in the period (e.g., the temperature rising period, carrying-in period for the substrates to be processed or the like), in which the sign of disconnection of the heater wire is likely to appear, upon estimating the life of the heater wire in advance before the heater wire used in the heating apparatus is disconnected, the life of the heater wire can be estimated more appropriately than when estimated by conventional means.

DETAILED DESCRIPTION OF THE INVENTION

Examples

Figure 1:
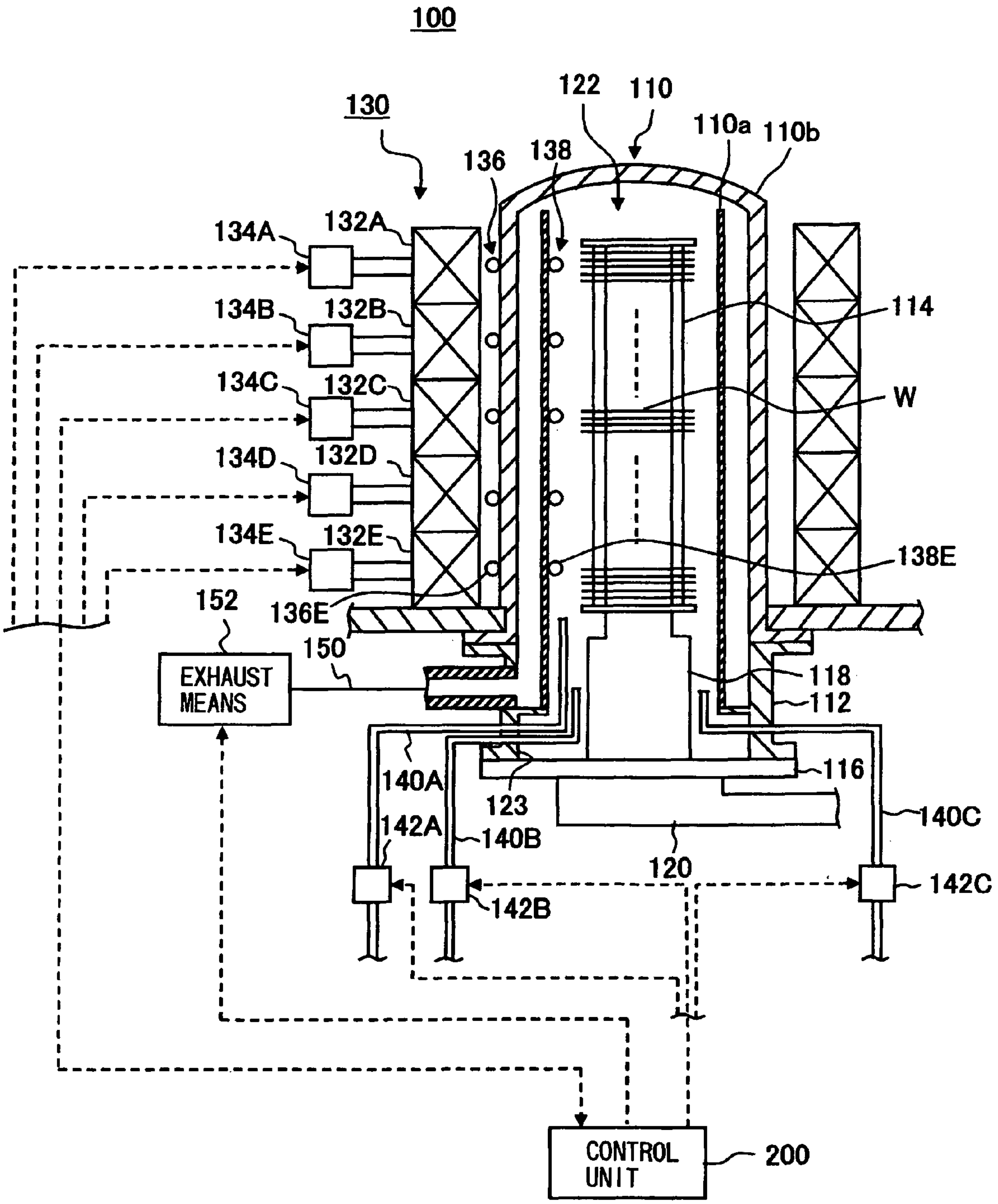
FIG. 1 is a longitudinal cross section showing one example of general construction of a vertical-type heating apparatus related to a first embodiment of the present invention.

Hereinafter, preferred embodiments of this invention will be detailed with reference to the accompanying drawings. In the description and drawings provided herein, components having substantially the same function and construction are respectively designated by the same reference numerals, and duplication of the explanation for those elements will be omitted.

The Heating Apparatus Related to the First Embodiment

Figure 2:
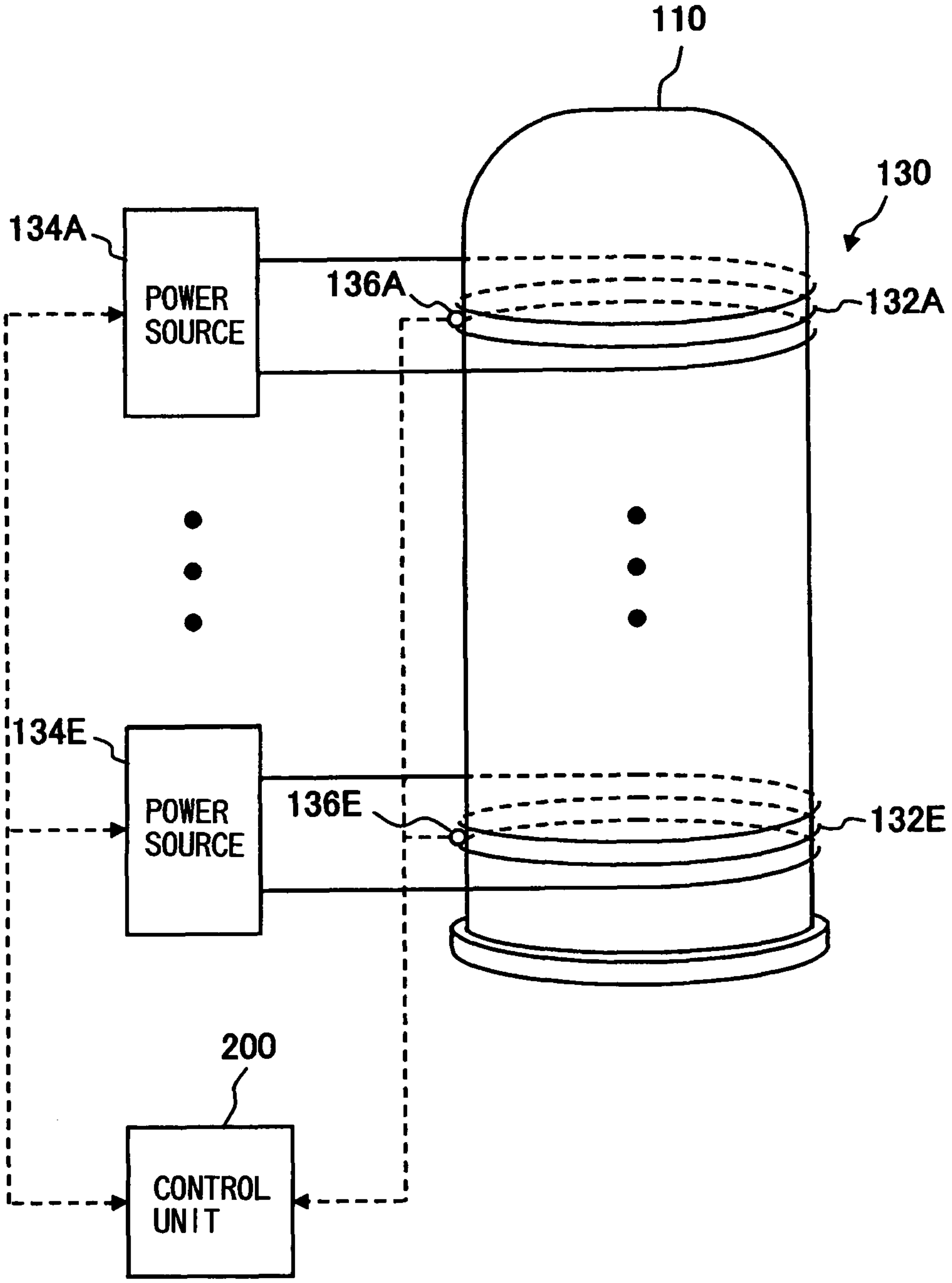
FIG. 2 is a block diagram showing general construction of an electric power system provided in the heating apparatus related to the first embodiment.

First, a vertical-type heating apparatus (hereinafter, also merely referred to as "a heating apparatus") 100, to which life estimation for the heater wire according to the first embodiment of this invention can be applied, will be described with reference to the drawings. FIG. 1 is a longitudinal cross section showing general construction of the vertical-type heating apparatus 100, and FIG. 2 is a block diagram showing general construction of the electric power system provided in the heating apparatus 100.

The heating apparatus 100, for example, as shown in FIG. 1, includes a processing chamber 122 configured to provide a heating process to wafers W. The processing chamber 122 is composed of a reaction vessel 110 and a manifold 112. The reaction vessel 110 has a double-vessel structure including an inner vessel 110*a* and an outer vessel 110*b*, respectively formed from quartz. Beneath the reaction vessel 110, the metallic and tubular manifold 112 are provided. The inner vessel 110*a* has an opening at its top end and is supported by the manifold 112. The outer vessel 110*b* has a ceiling, and is airtightly joined at its bottom end to a top end of the manifold 112.

In the reaction vessel 110, multiple sheets, for example, 150 sheets, of wafers W, i.e., substrates to be processed, are arranged in a shelf-like fashion in a wafer boat 114, i.e., a wafer holding tool (or substrate holding tool), such that the respective wafers W are horizontally oriented, with a predetermined gap provided therebetween in the vertical direction. The wafer boat 114 is held on a cover 116 via a heat insulating mould (or heat insulating member) 118.

The cover 116 is mounted on a boat elevator 120 adapted for carrying in and carrying out the wafer boat 114 relative to the reaction vessel 110, and, when in its upper limit position, serves to close a bottom end opening 123 of a substrate transfer port of the processing chamber 122 composed of the reaction vessel 110 and the manifold 112.

In the vicinity of the bottom end opening 123 of the reaction chamber 122, a shutter (not shown) is provided for shielding the bottom end opening 123 when the wafer boat 114 having been subjected to the heating process is carried out from the processing chamber 122.

Around the reaction vessel 110, a heater 130 is provided. The heater 130 includes heater wires 132A to 132E arranged, for example, in five stages, as shown in FIGS. 1 and 2. Namely, a heating region including the heater 130 is divided into a plurality of (i.e., five, in this embodiment) heating zones along a longitudinal direction (or vertical direction) of the reaction vessel 110, and each heater wire 132A to 132E is located in each heating zone.

Each heater wire 132A to 132E is composed of a resistance heating member formed from, for example, an iron-tantalum-carbon alloy or the like, and wound around the reaction vessel 110 so as to form a coil-like shape. Alternatively, the heater 130 may be provided by winding the heater wires 132A to 132E around an outer circumference of the reaction vessel 110 so as to form a wave-like shape.

Power sources 134A to 134E are connected respectively to the heater wires 132A to 132E, so that electric power can be supplied independently from each power source 134A to 134E to each heater wire 132A to 132E, respectively. Thus, each heater wire 132A to 132E can generate heat, depending on magnitude or amount of the electric power supplied thereto.

To an outer wall of the reaction vessel 110, external temperature sensors 136 (or 136A to 136E), each adapted for detecting temperature of each heater wire 132A to 132E for each heating zone arranged in the vertical direction (or longitudinal direction), are located. Additionally, to an inner wall of the inner vessel 110*a*, internal temperature sensors 138, each adapted for detecting temperature of an atmosphere in the reaction vessel 110 heated by each heater wire 132A to 132E for each heating zone arranged in the vertical direction (or longitudinal direction), are provided. The external temperature sensors 136 and internal temperature sensors 138 include, for example, a thermocouple. A control unit 200 is configured to obtain temperature detection values detected by the respective temperature sensors 136, 138, as temperature data (temperature information) for each heating zone, so as to control an amount of heat generation, while controlling the electric power supplied to each heater wire 132A to 132E, based on both of the detected temperature data and preset temperature data.

In this manner, according to the heater 130 related to this embodiment, the interior of the processing chamber 122 can be heated while being divided into five heating zones. Therefore, the temperature in the processing chamber 122 during the heating process can be kept uniformly, thereby providing the heating process to all of the wafers W without unevenness of temperature distribution.

To the manifold 112, a plurality of gas supplying pipes are connected for respectively supplying processing gases, such as dichlorosilane, ammonia, nitrogen gas and the like, from respective processing gas sources (not shown). In FIG. 1, to facilitate understanding, three gas supplying pipes 140A to 140C are shown. To each gas supplying pipe 140A to 140C, a flow rate controller 142A to 142C, such as a mass flow controller (MFC), is provided for controlling a flow rate of each gas.

Additionally, an exhaust means 152 is connected with the manifold 112 via an exhaust pipe 150. By this exhaust means 152, the atmosphere in the reaction vessel 110 can be discharged through a gap between the inner vessel 110*a* and the outer vessel 110*b*, thereby controlling pressure in the reaction vessel 110. The exhaust means 152 includes of various valves, such as combination valves, butterfly valves and the like, and a vacuum pump. It is also contemplated that a pressure sensor may be provided to the exhaust pipe 15 so that feed back control can be provided to the exhaust means 152 by optionally detecting the pressure in the processing chamber 122.

As the pressure sensor, it is preferred to use an absolute-pressure type sensor that is less susceptible to change of outside air pressure, while a differential-pressure type sensor may also be employed.

The control unit 200 provided in the heating apparatus 100 serves to control various processing parameters, such as the temperature of the processing atmosphere, gas flow rate, pressure and the like, in the reaction vessel 110. For example, the control unit 200 controls the electric power supplied to each heater wire 132A to 132E, by controlling each power source 134A to 134E based on the temperature data respectively sent from the external temperature sensors 136 and internal temperature sensors 138. In this way, the control unit 200 can elevate the temperature in the processing chamber 122 up to a predetermined heating temperature, so as to provide the heating process to the wafers W at the heating temperature.

In addition, the control unit 200 can measure the electric power supplied to each heater wire 132A to 132E. For example, the control unit 200 collects data of the electric power supplied to each heater wire 132A to 132E from each power source 134A to 134E during a predetermined period of time as described below, so as to estimate the life of each heater wire 132A to 132E based on the data.

(One Example of Construction of the Control Unit)

Figure 3:
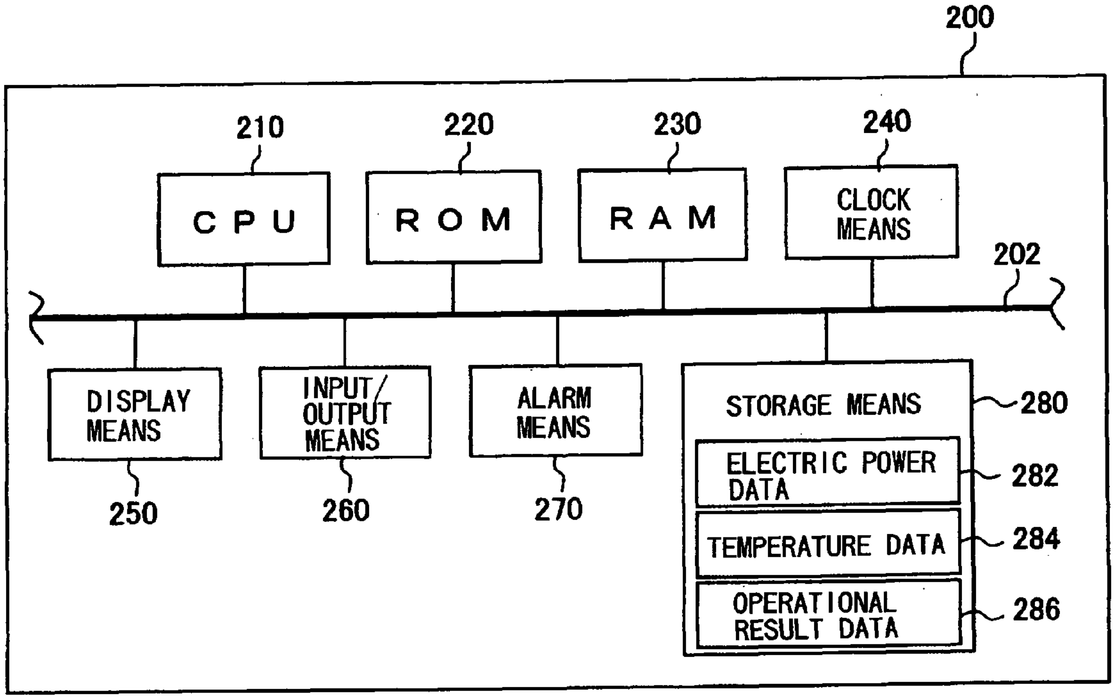
FIG. 3 is a block diagram showing general construction of a control unit of the heating apparatus related to the first embodiment.

Next, a specific example of construction of the control unit 200 will be described with reference to the drawings. FIG. 3 is a block diagram showing the specific example of the construction of the control unit 200. As shown in FIG. 3, the control unit 200 includes a central processing unit (CPU) 210 constituting a main body of the control unit, a read only memory (ROM) 220 in which a program (e.g., a processing program for the wafers W) for controlling each component and an operational program related to electric power data that will be described later and the like are stored, a random access memory (RAM) 230 provided with memory areas that are used for various data processes performed by the CPU 210, a clock means 240 composed of a counter or the like for clocking the time, a display means 250 composed of a liquid crystal display or the like for displaying an operational screen or optional screen, an input/output means 260 which can perform input operations of various data including input and/or edition of process recipes by an operator as well as output operations of various data including output of the process recipes and/or process logs to a predetermined storage medium, an alarm means 270 composed an alarm (e.g., a buzzer) and the like, and a storage means 280 composed of a hard disk (HDD) or memory adapted for storing therein the program (e.g., the processing program for the wafers W) for controlling each component by using the CPU 210 and an operational program and/or data, which will be described later, for the life estimation for the heater wire.

Furthermore, although not shown in the drawings, in addition to the units and means described above, the control unit 200 includes, for example, an input/output port (or I/O port) adapted for inputting each sensor signal and outputting each control signal. To the input/output port, for example, the external temperature sensors 136 (or 136A to 136E) and the internal temperature sensors 138 are connected, respectively. As needed, the control unit 200 receives a signal from each of the temperature sensors 136 (or 136A to 136E) and 138, via the input/output port. Additionally, the power sources 134A to 134E for the respective heater wires 132A to 132E are respectively connected to the input/output port, so that the control unit 200 can output a control signal, as needed, to each power source 134A to 134E, via the input/output port.

The CPU 210, ROM 220, RAM 230, clock means 240, display means 250, input/output means 260, alarm means 270, storage means 280, input/output port and the like are connected with one another via bus lines 202, such as control buses, system buses, data buses and the like.

In the storage means 280, for example, electric power data 282, temperature data 284, operational result data 286 and the like are stored. The temperature data 284 includes, for example, the detected temperature data obtained from the external temperature sensors 136 and internal temperature sensors 138 and preset temperature data set in advance for each heating zone. The electric power data 282 includes the data of the electric power supplied to each heater wire 132A to 132E from each power source 134A to 134E. The supplied electric power corresponds to actually supplied electric power (or wave form of the electric power) detected such as by attaching a wattmeter to each power source 134A to 134E. The operational data 286 includes, for example, resultant data from a predetermined operation performed by the CPU 210 by using the electric power data 282 and temperature data 284. More specifically, the maximum value and sum of squares of residuals of the electric power data 282 and the maximum value of the temperature data 284 and the like, respectively used in the estimation process for the life of the heater wire according to this embodiment and described later, can be mentioned as the operational data 286. Details of the operational data 286 will be described layer.

(One Specific Example of Operation of the Heating Apparatus)

Figure 4:
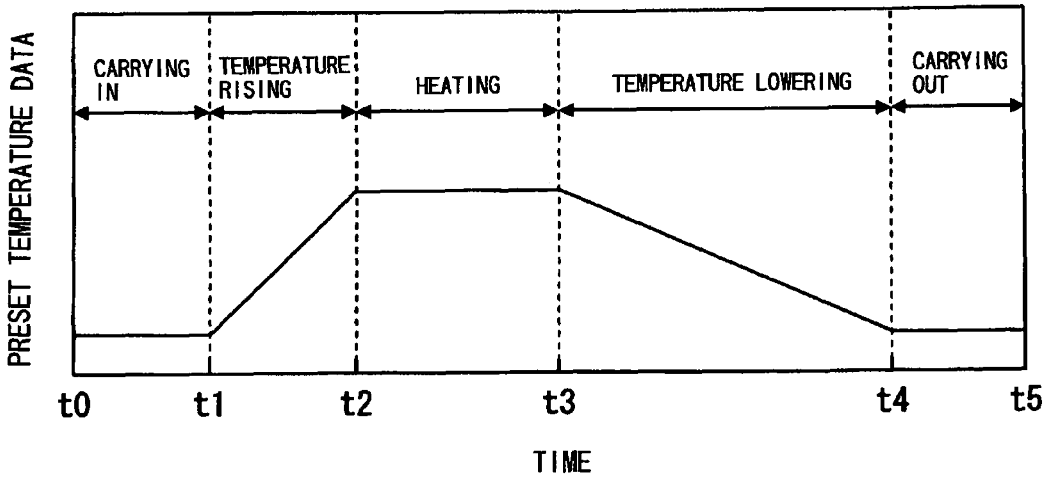
FIG. 4 is a profile showing preset temperature data in a processing chamber for each step performed by the heating apparatus related to the first embodiment.

Now, a specific example of operation of the heating apparatus 100 related to this embodiment will be discussed with reference to the drawings. The heating apparatus 100 is configured to repeatedly perform a series of steps for providing the heating process to the multiple sheets of wafers W, at a time, i.e., by one application of the apparatus, under control of the control unit 200. FIG. 4 is a profile showing preset temperature data in a processing chamber for each step performed by the one application of the heating apparatus 100.

As shown in FIG. 4, during a wafer-carrying-in period (or substrate-carrying-in period) of from time t0 to time t1, a step (or loading step) of carrying the multiple sheets of wafers W into the processing chamber 122 is performed. Specifically, the control unit 200 operates the shutter (not shown) to be opened from a state of closing the bottom end opening 123 of the processing chamber 122, and actuates the boat elevator 120 to elevate the cover 116, so as to carry the wafer boat 114 holding, for example, 150 sheets of wafers W, and the heat insulating mould 118 into the processing chamber 122. Thereafter, the bottom end opening 123 of the processing chamber 122 is closed again by using the cover 116. During this carrying-in period, the preset temperature in the processing chamber 122 is, for example, 650° C.

Thereafter, the interior of the processing chamber 122 is evacuated by the exhaust means 152, so as to be controlled at a predetermined pressure. At this time, pressure check whether the controlled pressure in the processing chamber 122 is kept constant or not is performed. If the pressure is judged to have no abnormality, the interior of the processing chamber 122 is purged by introducing an inert gas, for example, nitrogen gas, into the processing chamber 122 while controlling each flow rate controller 142A to 142C.

Next, during a temperature rising period of from time t1 to t2, a temperature rising step for elevating the temperature in the processing chamber 122 is performed, and then, during a heating period of from time t2 to t3, a predetermined heating step is performed. More specifically, from the time t1, the control unit 200 controls each power source 134A to 134E by using a control signal, so as to supply predetermined electric power to each heater wire 132A to 132E, thus heating the interior of the processing chamber 122. Thereafter, at the time t2 at which the interior of the processing chamber 122 reaches a predetermined heating temperature, for example, 900° C., the control unit 200 makes gas sources supply a predetermined processing gas into the processing chamber 122 while controlling each flow rate controller 142A to 142C, so as to provide the heating process, such as a film forming process by the vacuum CVD method, to the wafers W, until the time t3. The time corresponding to the temperature rising period of from t1 to t2 is set at, for example, 25 minutes. In this case, an elevating rate of the temperature (i.e., a temperature rising rate) in the processing chamber 122 during the temperature rising period is, for example, 10° C. per minute.

Once the heating process for forming a predetermined film on each wafer W is completed, a temperature-lowering step for lowering the temperature in the processing chamber 122 is performed during a temperature-lowering period of from time t3 to t4. Specifically, an inert gas is introduced, in place of the processing gas, into the processing chamber 122 at the time t3, so as to purge the interior of the processing chamber 122. At the same time, the supply of electric power from each power source 134A to 134E to each heater wire 132A to 132E is stopped. Consequently, the temperature of the processing chamber 122 is gradually lowered.

Subsequently, during wafer-carrying-out period (or substrate-carrying-out period) of from time t4 to t5, a carrying out step (or unloading step) of carrying out the wafer boat 114 from the reaction vessel 110 is performed. Specifically, once the temperature in the processing chamber 122 is decreased to, for example, 650° C., the pressure in the processing chamber 122 is controlled to return to the atmospheric pressure at the time t4. Thereafter, the cover 116 is lowered, and the plurality of wafers W placed in the wafer boat 114 are carried out from the processing chamber 122. Then, the bottom end opening 123 of the processing chamber 122 is shut off again by closing the shutter (not shown).

In this way, the series of steps (for one application) due to the heating apparatus 100 will be completed at the point of time t5 at which the carrying out step for the plurality of wafers W from the processing chamber 122 is ended. After completely performing the series of steps of from time t0 to time t5, the heating apparatus 100 will perform a next series of steps (i.e., the carrying out step of the wafers W, heating step, and carrying out step for the wafers W) by one application. Thereafter, the heating apparatus 100 will repeat each application consisting of the series of steps in the same manner.

In the case of repeating the applications each consisting of the series of steps as described above by using the heating apparatus 100, the interior of the processing chamber 122 must be alternately controlled at the relatively low temperature (e.g., 650°) for carrying in and carrying out the wafers W and at the relatively high temperature (e.g., 900° C.) for providing the heat process to the wafers W. Therefore, each heater wire 132A to 132E should be repeatedly brought into higher and lower temperature states, as such it may be suddenly disconnected, in a shorter period of time, depending on the conditions of the heating process.

If any one of the heater wires 132A to 132E is disconnected during the heating process, the heating process becomes insufficient for the wafers W contained in the batch, as such all of the wafers contained in the batch will be regarded as scraps, thus increasing the lost cost and wasting the time spent for the heating process.

Therefore, the heating apparatus 100 related to this embodiment is configured to perform the estimation process for the life of each heater wire 132A to 132E in order to avoid such an event that the heater wire 132A to 132E is suddenly disconnected during the heating process.

Namely, in the estimation process for the life of the heater wire in this embodiment, data obtained during a period of time (e.g., the temperature rising period and the like), in which a sign of the disconnection of each heater wire 132A to 132E is more likely to appear is employed, rather than employing the data obtained during the stabilized temperature period. The reason for this is as follows. If each heater wire 132A to 132E is not yet disconnected, when electric power is supplied thereto, the sign of disconnection of each heater wire 132A to 132E is more likely to appear during, for example, the temperature rising period, in which the temperature is still rising and changing before reaching the predetermined temperature, than during the stabilized temperature period after it has already reached the predetermined temperature. In addition, during the temperature rising period, difference between the case in which any one of the heater wires 132A to 132 is degraded and the case in which none of them is degraded can be grasped more readily.

Due to such estimation for the life of each heater wire 132A to 132E by utilizing the data obtained during the period in which the sign of disconnection of the heater wire is more likely to be seen than during the stabilized temperature period, the life of the heater wire can be estimated more appropriately than the conventional estimating method as described above. In addition, since the sign of disconnection may tend to appear in an earlier period during the temperature rising period than during the stabilized temperature period, the estimation for the life of the heater wire can be performed in an earlier period than conventional. This can provide a well-established maintenance schedule for the heating apparatus 100 for preparing and exchanging parts, for example, for each heater wire 132A to 132E.

Life Estimation for the Heater Wire in the First Embodiment

Next, the life estimation for the heater wire in the first embodiment will be described. In this case, the estimation of the life of each heater wire 132A to 132E in the heating apparatus 100 by utilizing the data of the electric power supplied to the heater wire 132A to 132E during the temperature rising period (from t1 to t2 of, for example, 25 minutes) in which the temperature in the processing chamber 122 is elevated from, for example, 650° C. up to the heating temperature (for example, 900° C.), will be discussed by way of example. More specifically, the life of each heater wire 132A to 132E is estimated, for example, by collecting the data of the electric power (hereinafter, also and merely referred to as "supplied electric power") supplied to each heater wire 132A to 132E from each power source 134A to 134E, and then analyzing the collected electric power data.

Figure 5:
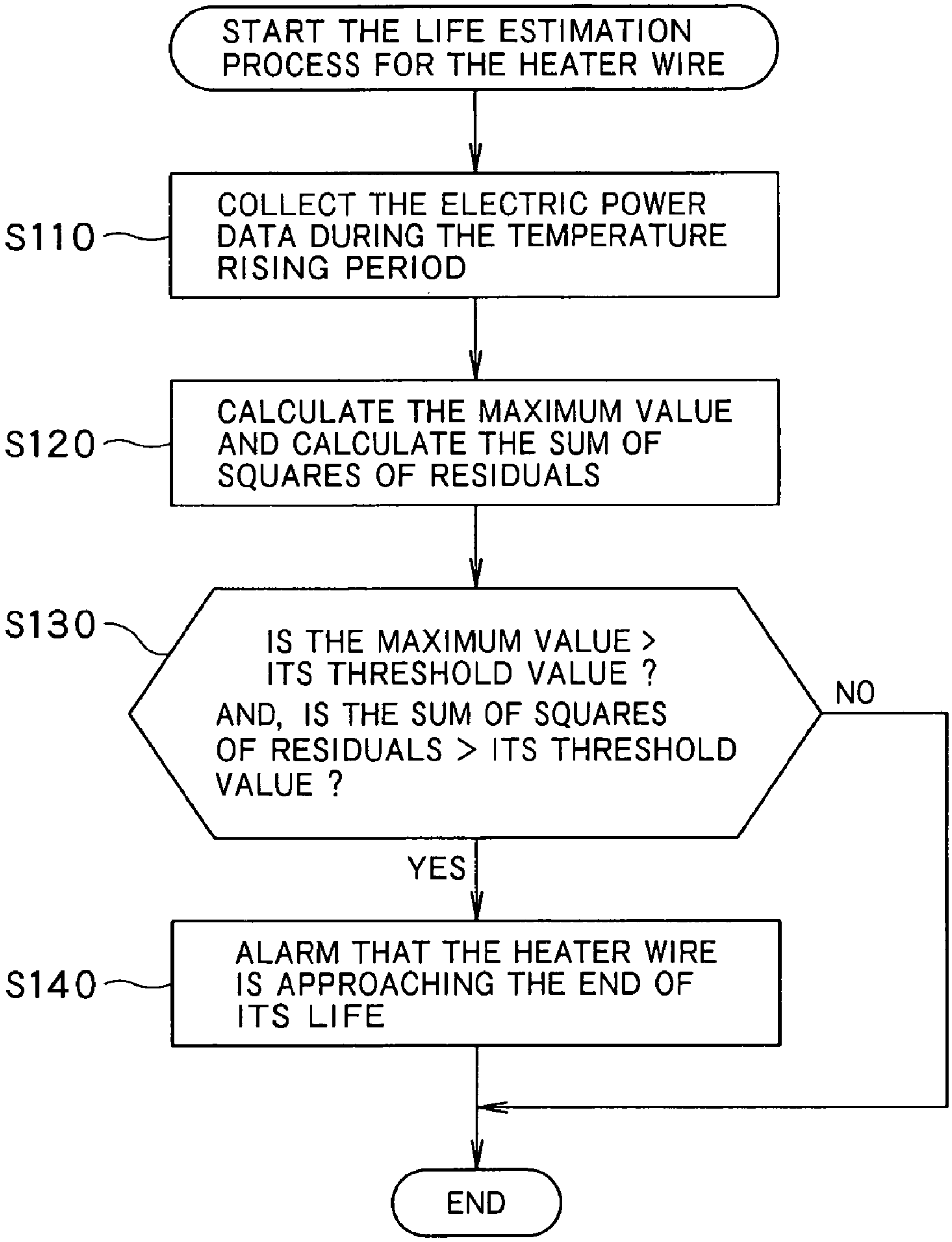
FIG. 5 is a flow chart showing a specific example of an estimation process for the life of the heater wire related to the first embodiment.

FIG. 5 is a flow chart showing a specific example of the estimation process for the life of the heater wire (herein after, also and merely referred to as "the life estimation process") related to the first embodiment. The estimation process for the life of the heater wire described in the flow chart shown in FIG. 5 is performed, based on a predetermined program, due to the control unit 200, for one application (or one batch) of the heating apparatus 100.

First, in a step S110, the data of the electric power supplied to each heater wire 132A to 132E from each power source 134A to 134E is collected. In this case, the data of the electric power obtained during the temperature rising period of from t1 to t2 for one application of the heating apparatus 100 is collected, and the collected data is then stored in the storage means 280, as the electric power data 282.

Now, comparison between the case in which the degradation of the heater wire is advanced and the case in which the heater wire is not degraded but in a normal condition will be discussed, with respect to the electric power data obtained during the aforementioned temperature rising period, with reference to the drawings. In the case of performing the life estimation based on the electric power data obtained during the temperature rising period, the life of all of the heater wires 132A to 132E can be estimated in the same manner. Therefore, the case of estimating the life of only the heater wire 132A that is located uppermost will be described below by way of example.

Figure 6A:
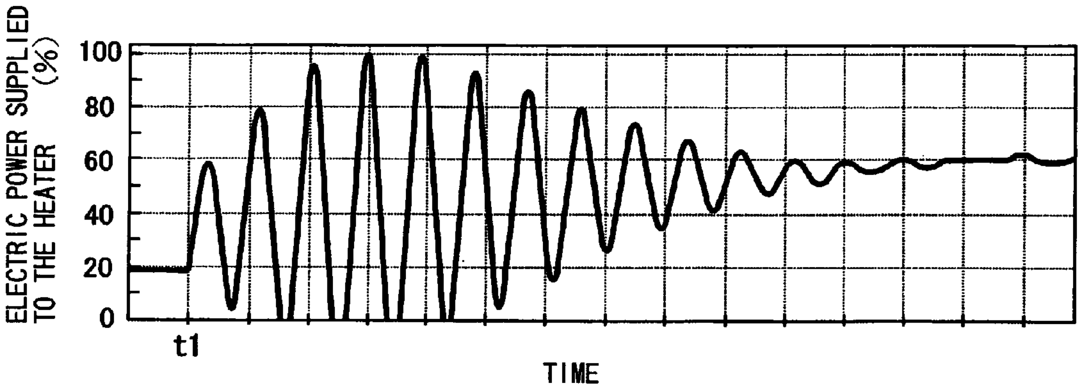
FIG. 6A is a graph showing a wave form of electric power supplied to the heater wire approaching the end of its life due to degradation during a temperature rising period.
Figure 6B:
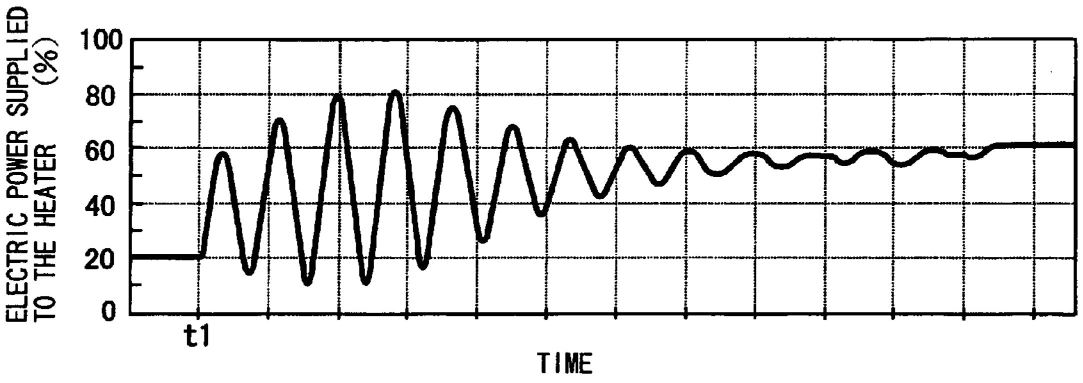
FIG. 6B is a graph showing a wave form of the electric power supplied to the heater wire not yet degraded during the temperature rising period.

FIGS. 6A and 6B are graphs respectively showing wave forms of the electric power supplied to the heater wire 132A from the power source 134A, during the temperature rising period, in order to adjust the interior of the processing chamber 122A at a predetermined heating temperature. FIG. 6A is a graph showing the wave form of the electric power supplied to the heater wire 132A approaching the end of its life because of degradation, and FIG. 6B is a graph showing a wave form of the electric power supplied to the heater wire not yet degraded but in a normal state. In FIGS. 6A and 6B, the vertical axis designates values of the electric power supplied to the heater wire 132A, while the horizontal axis expresses the time during which the electric power is supplied to the heater wire 132A. Additionally, in FIGS. 6A and 6B, the maximum electric power (hereinafter, referred to as "the rated power") that the power source 132A can supply to the heater wire 132A is expressed by 100%, while zero watt (0 W) is expressed by 0%.

From comparison of FIG. 6A with FIG. 6B, it is found that the maximum value and amplitude of the electric power become greater as the degradation of the heater wire 132A is progressed. The reason for this is as follows. If the heater wire 132A is degraded, the interior of the processing chamber 122 cannot be adjusted to the predetermined heating temperature within a predetermined period unless unduly greater electric power is supplied thereto from the power source 134. In an example shown in FIG. 6A, the power source 134A supplies the rated power instantaneously to the heater wire 132A in order to adjust the interior of the processing chamber 122 to the predetermined heating temperature in a time period set as the temperature rising period.

With the degradation of the heater wire 132A, the time required for disappearing an alternating current component and stabilizing the waver form of the electric power becomes longer. The reason for this is as follows. If the heater wire 132A is degraded, the interior of the processing chamber 122 cannot be adjusted to the predetermined heating temperature within the period set as the temperature rising period unless unduly greater electric power is supplied for an unduly longer time to the heater wire 132A from the power source 134A.

Taking notice of such characteristics of the electric power, we utilized them changed into a numerical form for the life estimation process for the heater wire 132A in this embodiment. In this case, the characteristics showing the degradation of the heater wire 132A as described above, for example, the maximum value and magnitude of amplitude of the supplied electric power, will appear conspicuously in the wave form of the electric power observed during the temperature rising period. Contrary, in the heating period of from t2 to t3, i.e., during the stabilized temperature period, because the alternating current component has already disappeared from the wave form of the supplied electric power, it is difficult to accurately detect the maximum value and magnitude of amplitude of the supplied electric power.

Therefore, the control unit 200 related to this embodiment performs various operational processes for calculating the maximum value and magnitude of amplitude of the electric power supplied to, for example, the heater wire 132A, by using the collected electric power data, in order to change the characteristics of the wave form of the electric power as described above into numerical values, after collecting the data of the electric power supplied to the heater wire 132A during the temperature rising period in the step S110.

The term "the magnitude of amplitude of the supplied electric power" means the magnitude of the sum of amplitude of the supplied electric power during the temperature rising period, rather than the magnitude of amplitude of the electric power that is supplied instantaneously. Thus, the amplitude of the supplied electric power will be greater, as the amplitude of each wave constituting the alternating current component of the supplied electric power during the temperature rising period is greater, as the point of time at which the alternating current component will disappear is more delayed, and as the time required for stabilizing the supplied electric power becomes longer.

As the various operational processes, in a step S120 in the life estimation process shown in FIG. 5, the maximum value and magnitude of amplitude of the supplied electric power during the temperature rising period are obtained based on the collected electric power data. Among the obtained values, the maximum value of the supplied electric power is calculated as the rated power of the power source 134A in the example shown in FIG. 6A, while it is calculated as 80% of the rated power in the example shown in FIG. 6B. These maximum values calculated in such a manner are then stored in the storage means 280 as the operational result data 286.

Since each time the heating apparatus 100 performs one application (or batch process), the step 120 is carried out to calculate the maximum value of the supplied electric power, a transition for each application (or batch process) with respect to the maximum value of the supplied electric power during the temperature rising period can be grasped.

Figure 7:
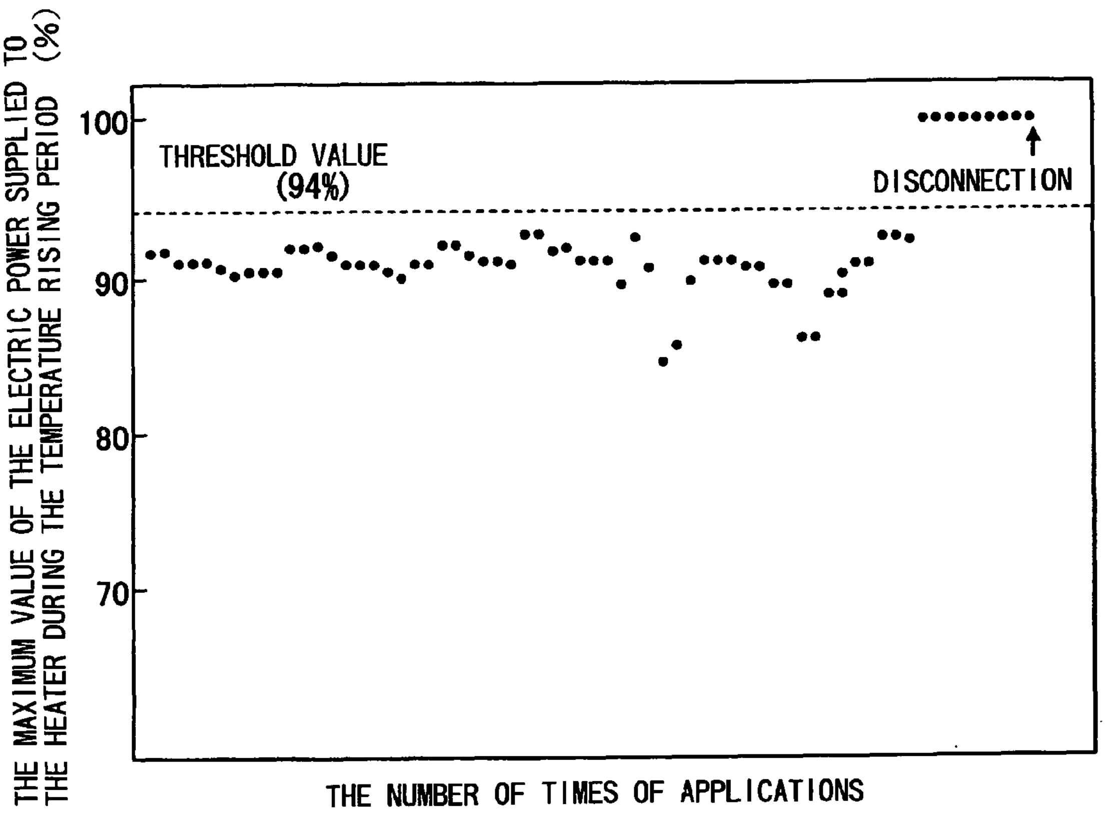
FIG. 7 is a graph showing a transition for each number of times of applications, with respect to the maximum value of the electric power supplied to the heater wire, during the temperature rising period.

FIG. 7 shows the transition for each number of times of applications, with respect to the maximum value of the supplied electric power during the temperature rising period. As shown in FIG. 7, as the number of times of applications of the heating apparatus 100 is increased and reaches a certain value, the maximum value of the supplied electric power is suddenly increased. This phenomenon can be regarded as a sign of the disconnection of the heater wire 132A. In fact, in an example shown in FIG. 7, the heater wire 132A was disconnected during an eighth application after the maximum value of the supplied electric power was suddenly increased.

In this embodiment, in order to judge such sudden increase of the maximum value of the supplied electric power, a threshold value is provided to the maximum value of the supplied electric power. Because the maximum value of the supplied electric power has higher probability that it will vary with the heating condition, it is preferred to set the threshold value, taking into account the heating condition. For example, under the heating condition that the temperature in the processing chamber 122 is elevated from 650° C. to 900° C. during the temperature rising period of 25 minutes, the threshold value is set at, for example, "94%".

In the step S120, an index indicative of the magnitude of amplitude is also obtained, in addition to the maximum value of the supplied electric power. In this embodiment, for example, the sum of squares of residuals of maximum values and minimum values of the supplied electric power is calculated as the index indicative of the magnitude of amplitude, thereby judging the magnitude of amplitude of the supplied electric power based on the calculated sum of squares of residuals.

Figure 8:
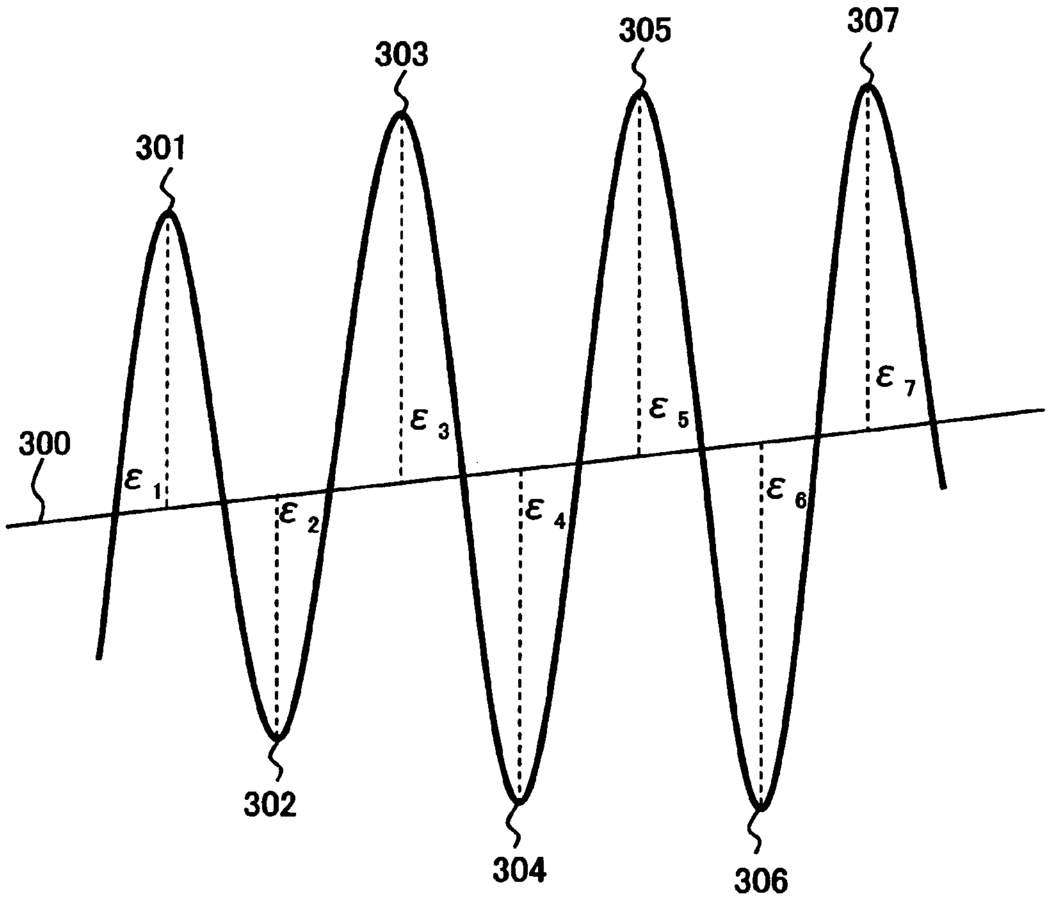
FIG. 8 is a diagram enlarging and showing a part of the wave form of the electric power supplied to the heater wire during the temperature rising period.

Now, a specific example of a method of calculating the sum of squares of residuals of the maximum values and minimum values of the supplied electric power will be described with reference to the drawings. FIG. 8 is a diagram enlarging and showing a part of the wave form of the supplied electric power during the temperature rising period. First, the control unit 200 obtains a regression line 300, by using, for example, the least squares method, with respect to extreme values (i.e., the maximum values and minimum values) 301, 302, . . . , 307, . . . , of the wave form.

Next, the control unit 200 obtains differences (or residuals) $\epsilon_i$ (i=1, 2, . . . , 7, . . . ) between the regression line 300 and the respective extreme values 301, 302, . . . , 307, . . . , during the temperature rising period, and then calculates the sum total of squares of the respective residuals, i.e., the sum of squares of residuals. The sum of squares of residuals obtained in such a manner becomes greater as the amplitude of the supplied electric power is greater. In this manner, since the sum of squares of residuals indicates a value corresponding to the magnitude of amplitude of the supplied electric power, the magnitude of amplitude of the supplied electric power can be judged based on the sum of squares of residuals. Furthermore, as described above, since the amplitude of the supplied electric power during the temperature rising period becomes greater as the heater wire 132A is degraded, the value of the sum of squares of residuals can be used as the index for appropriately judging conditions of the degradation of the heater wire 132A. Then, the sum of squares of residuals of the supplied electric power calculated as described above is stored in the storage means 280 as the operational result data 286.

The control unit 200 will calculate the magnitude of amplitude of the supplied electric power, i.e., the sum of squares of residuals, by carrying out the step S120 each time the heating apparatus performs the application (or batch process). Consequently, the transition for each application, with respect to the sum of squares of residuals of the supplied electric power during the temperature rising period, can be grasped.

In this embodiment, the supplied electric power, as shown in FIGS. 6A and 6B, is expressed by percentage, based on the rated power as 100%, and the residuals and the sum of squares of residuals are also calculated by using numerical values of the supplied electric power expressed by percentage. However, since the sum of squares of residuals has only to reflect the magnitude of amplitude of the supplied electric power, the values of the supplied electric power expressed, for example, by watt (W), may also be directly used for the calculation of the residuals and the sum of squares of residuals.

Figure 9:
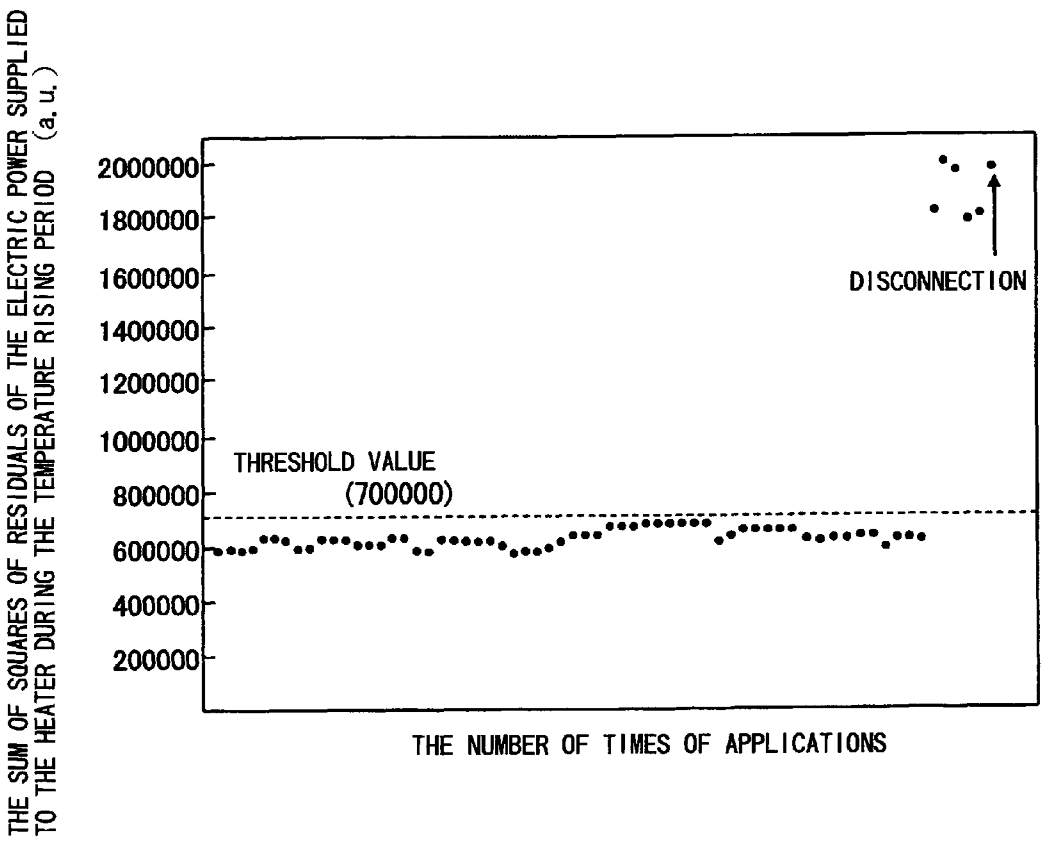
FIG. 9 is a graph showing a transition for each number of times of applications, with respect to a sum of squares of residuals of the electric power supplied to the heater wire, during the temperature rising period.

FIG. 9 shows the transition for each number of times of applications with respect to the sum of squares of residuals of the supplied electric power during the temperature rising period. As shown in FIG. 9, as the number of times of applications of the heating apparatus 100 is increased and reaches a certain value, the sum of squares of residuals of the supplied electric power is suddenly increased. This phenomenon can be considered as the sign of disconnection of the heater wire 132A. In fact, in an example shown in FIG. 9, the heater wire 132A was disconnected during a fifth application after the sum of squares of residuals of the supplied electric power was suddenly increased.

In this embodiment, in order to recognize the sudden increase of the sum of squares of residuals of the supplied electric power, a threshold value is provided to the sum of squares of residuals of the supplied electric power. Because, like the maximum value of the supplied electric power, the sum of squares of residuals of the supplied electric power has higher probability that it will vary with the heating condition, it is preferred to set the threshold value, taking into account the heating condition. For example, under the heating condition that the temperature in the processing chamber 122 is raised from 650° C. to 900° C. (heating temperature) during the temperature rising period from t1 to t2 of 25 minutes, this threshold value is set at, for example, "700000 a.u. (arbitrary unit)".

Thereafter, in a step S130, whether or not the maximum value and sum of squares of residuals of the supplied electric power are greater than the respective threshold values is judged. If at least either one of the maximum value and sum of squares of residuals of the supplied electric power is not greater than the threshold value, the heater wire 132A will be regarded as one having no sign of disconnection and being normal, and thus the life estimation process for this application (or batch process) will be ended.

Contrary, in the step S130, if the maximum value of the supplied electric power is greater than its threshold value as well as the sum of squares of residuals of the electric power exceeds its threshold value, the heater wire 132A will be judged to have a sign of disconnection and judged to be approaching the end of its life. As a result, a life alarming process for giving a notice that the heater wire is approaching the end of its life is performed in a step S140. More specifically, as the life alarming process for the heater wire, for example, the alarm means 270, such as a buzzer or the like, is driven, or otherwise a message that the heater wire 132A is nearing the end of its life is displayed on the display means 250 or the like. Thereafter, the life estimation process for the heater wire in this application (or batch process) will be ended.

In accordance with this life alarming process, an operator of the heating apparatus 100 can prepare for exchanging parts of, for example, the heater wire 132A itself or the entire heater 130 including the heater wire 132A, and make the maintenance schedule for the exchange work in the heating apparatus 100. The first embodiment is designed to achieve an early-stage life estimation for the heater wire 132A. Thus, according to this embodiment, the heater wire 132A will not be disconnected immediately after the life alarming process. In fact, it was found that the heater wire 132A will be disconnected after the heating process is further performed five to eight times after the alarming process has been conducted. Accordingly, since a procedure for the maintenance and preparations for exchanging parts can be performed with plenty of time, the operator can carry out smooth maintenance work for the heating apparatus 100.

As described above, according to the first embodiment, the maximum value and sum of squares of residuals of the supplied electric power during the temperature rising period are calculated, respectively, so as to estimate the life of the heater wire 132A. Because the change of the supplied electric power during the temperature rising period is greater than the supplied electric power during the heating period (or stabilized temperature period), the sign of disconnection of the heater wire 132A will appear conspicuously both in the maximum value and in the sum of squares of residuals of the supplied electric power during the temperature rising period. Besides, in the first embodiment, the threshold values are respectively set for the maximum value and for the sum of squares of residuals of the supplied electric power, corresponding to the heating conditions. Thus, with the life estimation process related to the first embodiment, the life of the heater wire 132A can be estimated in an earlier period and more appropriately than the conventional method as described above.

Furthermore, in the first embodiment, the life of the heater wire 132A can be estimated, from various angles, based on the two indexes, i.e., the maximum value and the sum of squares of residuals of the supplied electric power. Accordingly, highly reliable estimation results can be obtained.

Additionally, in the first embodiment, the heater wire 132A will be judged to have the sign of disconnection when the maximum value of the supplied electric power exceeds its threshold as well as the sum of squares of residuals of the supplied electric value is greater than its threshold value. However, in place of employing such a judging criterion, for example, the heater wire 132A may be judged to have the sign of disconnection where either one of the maximum value and the sum of squares of residuals is greater than its threshold value. When the latter judging criterion is employed, the degradation of the heater wire 132A can be judged in a further earlier stage, thereby more securely avoiding the sudden and/or inadvertent disconnection of the heater wire 132A.

In the first embodiment, as shown in FIG. 5, the maximum value of the supplied electric power and the sum of squares of residuals are first calculated in the step S120, and the comparative judgment between the respective calculated values and the threshold values is then performed in the step S130. However, this invention is not limited to this order or procedure. For example, the comparative judgment between the value obtained by the calculation of the maximum value of the supplied electric power and its threshold value may be first performed, and the comparative judgment between the value obtained by the calculation of the sum of squares of residuals of the supplied electric power and its threshold value may then be carried out. Conversely, the comparative judgment between the result of the calculation of the sum of squares of residuals of the supplied electric power and its threshold value may be first performed, and then the comparative judgment between the result of the calculation of the maximum value of the supplied electric power and its threshold value may be carried out.

Additionally, as described above, in the first embodiment, the life of the heater wire 132A is estimated based on the two indexes, i.e., the maximum value and the sum of squares of residuals of the supplied electric power. However, depending on the heating condition, the life of the heater wire 132A may be estimated based on only one of the two indexes. For instance, under the heating condition such that a target temperature is relatively high and a relatively short time is set as the temperature rising period, the maximum value of the supplied electric power may tend to be 100% in the temperature rising period even though the heater wire 132A is not yet degraded. Therefore, even if the maximum value of the supplied electric power is obtained under such a condition, it might be difficult to judge the degradation of the heating wire 132A. Accordingly, under such a heating condition, it is preferred to estimate the life of the heater wire 132A based on only the magnitude of amplitude of the supplied electric power during the temperature rising period.

As discussed above, the plurality of heater wires 132A to 132E are provided to the heating apparatus 100 related to the first embodiment, while the case in which the life of only the heater wire 132A thereof is estimated has been described so far. However, also for the other heater wires 132B to 132E, the life can be estimated independently, in the same manner as in the case of the heater wire 132A.

More specifically, the control unit 200 collects the data of the supplied electric power during the temperature rising period for each heater wire 132A to 132E, and then obtains the maximum value and sum of squares of residuals of the supplied electric power. Thereafter, the control unit 200 judges the conditions of the maximum value and the sum of squares of residuals, for each heater wire 132A to 132E, so as to estimate the life of each heater wire 132A to 132E.

In this manner, when judging the conditions of the maximum value and the sum of squares of residuals of the supplied electric power for each heater wire 132A to 132E, it is preferred to use the threshold values respectively set for each heater wire 132A to 132E.

For example, for the heater wire usually supplied with electric power approximating to the rated power in order to adjust the temperature in the processing chamber 122 at a higher temperature within a shorter time, it is preferred to set the threshold value for judging the maximum value of the supplied electric power at a value near to the rated power. Similarly, for the heater wire usually supplied with electric power having greater amplitude, it is preferred to set the threshold value for judging the sum of squares of residuals of the supplied electric power at a relatively great value.

In the case in which the control unit 200 estimates that at least one of the heater wires 132A to 132E is approaching the end of the life, only the estimated heater wire or wires, or otherwise the entire heater 130 can be exchanged.

As described above, in the heating apparatus 100 provided with the plurality of heater wires 132A to 132E, the life of any of the heater wires 132A to 132E can be estimated, respectively, within an earlier period of time and with higher accuracy, by setting the threshold values respectively corresponding to the heating condition for each heater wire 132A to 132E.

In the life estimation process for the heater wires related to the first embodiment, the case of estimating the life of each heater wire due to data analysis employing the so-called single-variate analysis, in which the life of each heater wire 132A to 132E is estimated based on the maximum value of the supplied electric power, or otherwise the life of each heater wire 132A to 132E is estimated based on the magnitude of amplitude of the supplied electric power, has been discussed. However, the life estimation process is not limited to this method. For instance, the life of the entire heater 130 may also be estimated from a result of the so-called multiple-variate analysis, in which the maximum values and sums of squares of residuals of the supplied electric power of the respective heater wires 132A to 132E are collectively analyzed as variables.

Life Estimation for the Heater Wire in the Second Embodiment

Next, the life estimation for the heater wire in the second embodiment of the present invention will be described. In the description, a case in which the life estimation for the heater wire is performed based on the multiple-variate analysis will be discussed by way of example. Specifically, in the case of estimating the life of the heater 130 composed of, for example, five heater wires 132A to 132E, whether or not there is the sign of disconnection of at least one of the heater wires 132A to 132E is judged, based on the result of the multivariate analysis for data included in the electric power data, e.g., the maximum value and the sum of squares of residuals of the electric power (e.g., ten variables), obtained by measuring the electric power supplied to the respective heater wires 132A to 132E during the temperature rising period in a certain heating process. This discriminate analysis employs a technique of, for example, the so-called Mahalanobis' distance (MD).

What is meant by the "Mahalanobis' distance" is a degree of separation or difference between a center of distribution of a plurality of valuables and a certain valuable to be discriminated, with respect to, for example, the heater wire or wires, under a normal condition (or in a steady state) that is not yet degraded. According to this discriminate analysis, the Mahalanobis' distance is obtained for the valuable to be discriminated, and if the obtained distance exceeds a predetermined threshold value, one can reach judgment that there is degradation in any of the heater wires 132A to 132E.

An MD model (or model equation) for obtaining a value of the Mahalanobis' distance (hereinafter, also referred to as "an MD value") as described above is obtained in advance due to the control unit 200 before the application (or batch process) for the heating process for the plurality of wafers W is performed in the heating apparatus 100. More specifically, the control unit 200 collects the electric power data, in advance, from each power source 134A to 134E for supplying the electric power to each heater wire 132A to 132E in a normal condition, calculates the maximum value and the sum of squares of residuals based on each electric power data, and prepares the MD model for calculating the Mahalanobis' distance by using the calculated result, and then stores the MD model into the storage means 280. Upon actual application of the heating apparatus 100, the control unit 200 obtains the MD value by using the MD model, so as to perform the life estimation for each heater wire based on the MD value. As the normal heater wires each used for preparing the MD model, it is preferred to use, for example, the heater wire just after exchanged, while the heater wire used in frequency lower than a predetermined frequency defined as one before the sign of heater disconnection appears may be used.

(One Specific Example of the Life Estimation Process for the Heater Wire)

Figure 10:
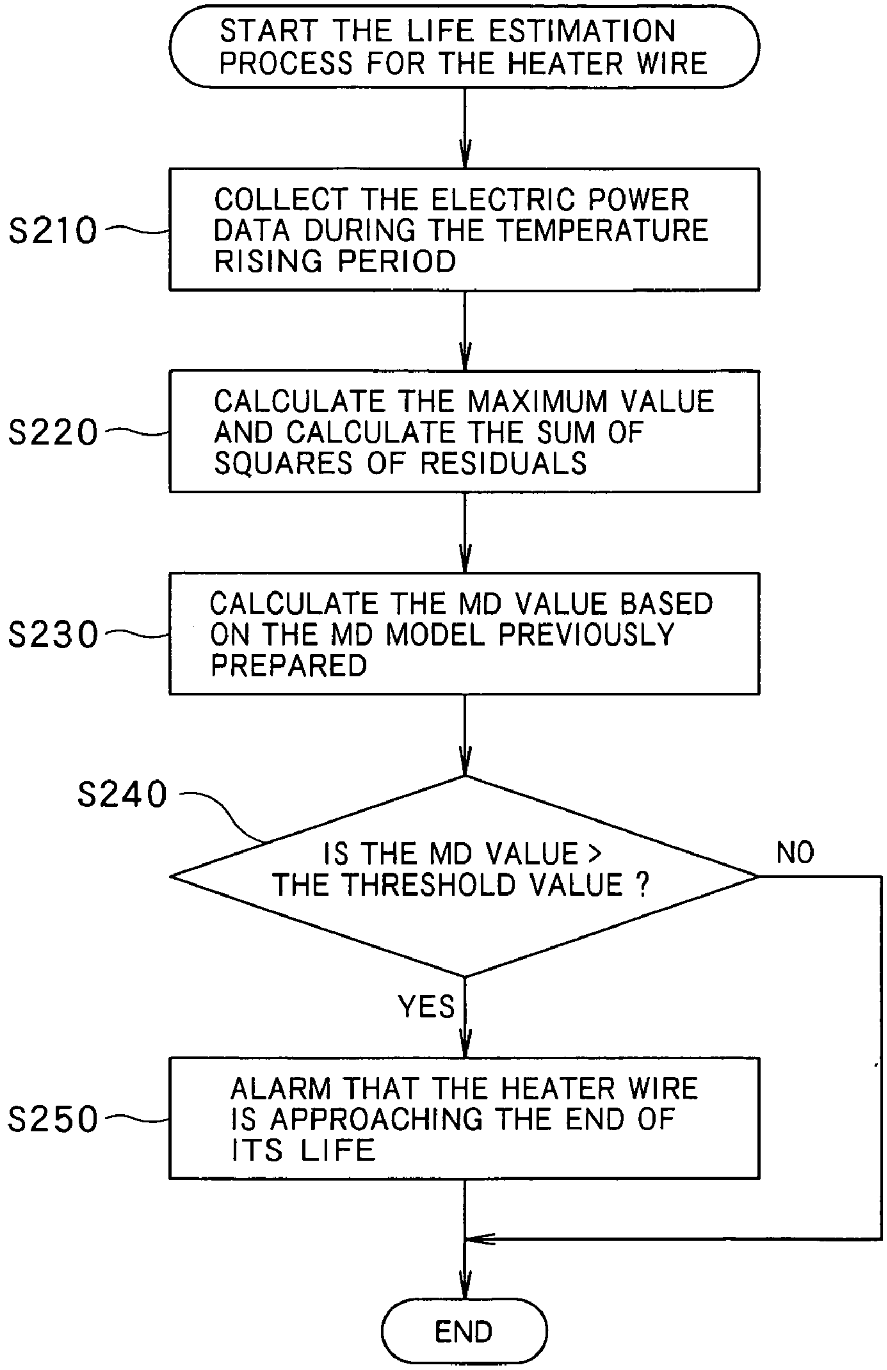
FIG. 10 is a flow chart showing a specific example of the estimation process for the life of the heater wire related to a second embodiment of the present invention.

Hereinafter, a specific example of the life estimation process for the heater wire related to the second embodiment will be described. In this life estimation process for the heater wire, an example, in which the MD value is obtained by using the MD model that has been prepared in advance, as described above, so as to perform the life estimation for the heater wire based on the MD value, will be described by way of example. FIG. 10 is a flow chart showing one specific example of the life estimation process related to the second embodiment. The life estimation process related to the second embodiment is performed by the control unit 200 based on a predetermined program each time the application (or batch process) for the heating process is provided to the plurality of wafers W in the heating apparatus 100.

First, in a step S210, the control unit 210 collects data of the electric power supplied to each heater wire 132A to 132E from each power source 134A to 134E. At this time, the control unit 210 collects the electric power data indicative of the electric power supplied to each heater wire 132A to 132E from each power source 134A to 134E, during at least the temperature rising period of from t1 to t2, in the whole period of the one application of the heating apparatus 100. The collected electric power data 282 is then stored in the storage means 280.

Thereafter, in a step S220, the maximum value and sum of squares of residuals of the supplied electric power during the temperature rising period are obtained, for each heater wire 132A to 132E, based on the collected electric power data.

The method for calculating the maximum value and the sum of squares of residuals is the same as that discussed in the step S120 of the first embodiment. Then, the calculated maximum value and sum of squares of residuals of the supplied electric power are stored in the storage means 280, for example, as the operational result data 286.

Subsequently, in a step S230, the maximum value and the sum of squares of residuals of the supplied electric power of each heater wire 132A to 132E stored as the operational result data 286 in the storage means 280 are read out, so as to obtain the value of Mahalanobis' distance (i.e., MD value) by analyzing these ten valuables.

Figure 11:
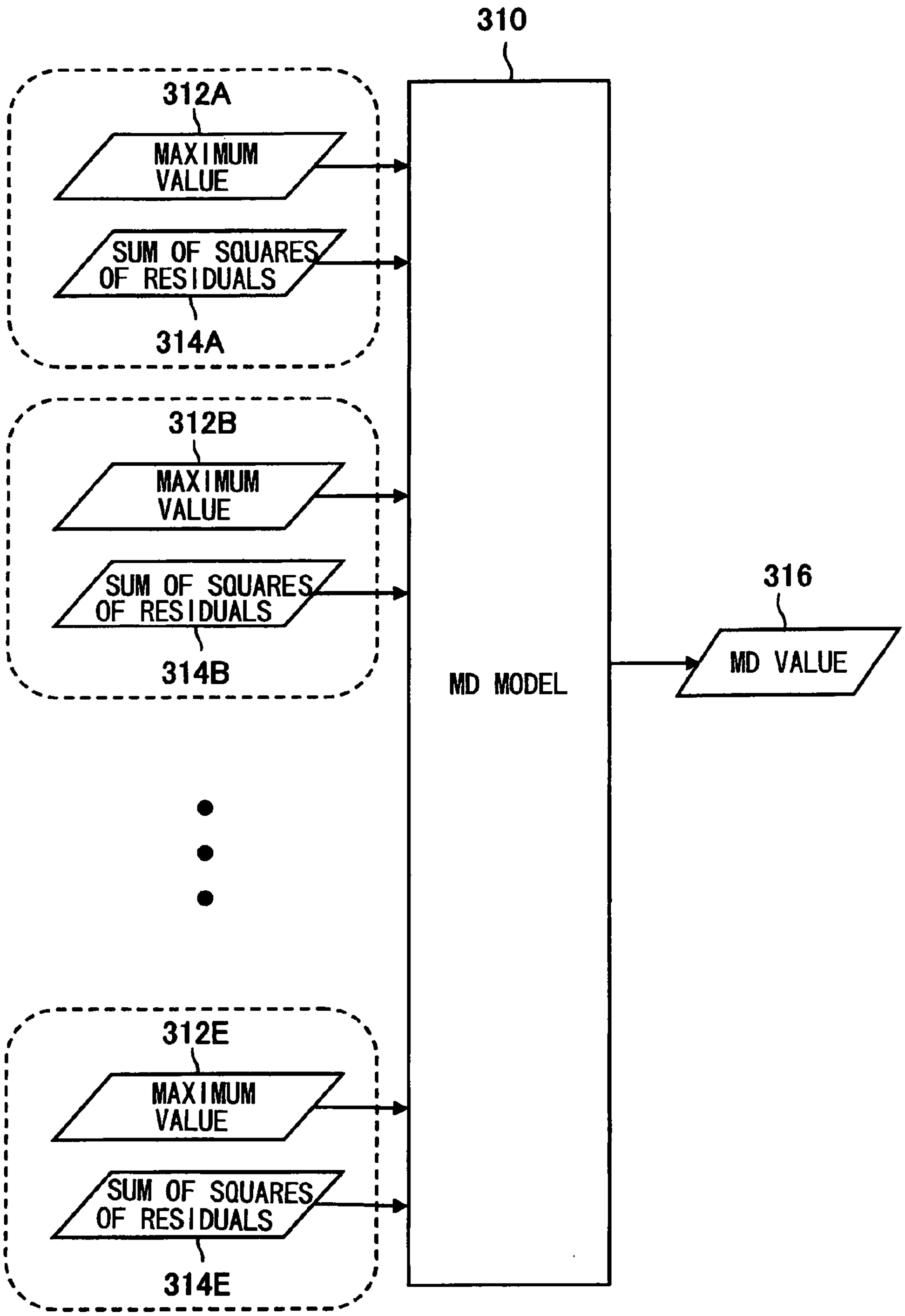
FIG. 11 is an illustration showing a process for obtaining an MD value in the life estimation process related to the second embodiment.

In this case, for instance, as shown in FIG. 11, the control unit 200 inputs the ten valuables, i.e., the maximum values 312A to 312E and the sums of squares of residuals 314A to 314E of the supplied electric power of the respective heater wires 132A to 132E calculated in the step S220, into the MD model 310 that has been prepared in advance. Consequently, the MD value 316 corresponding to the ten valuables to be discriminated, i.e., the maximum values and sums of squares of residuals of the supplied electric power of the respective heater wires 132A to 132E, can be obtained.

Figure 12:
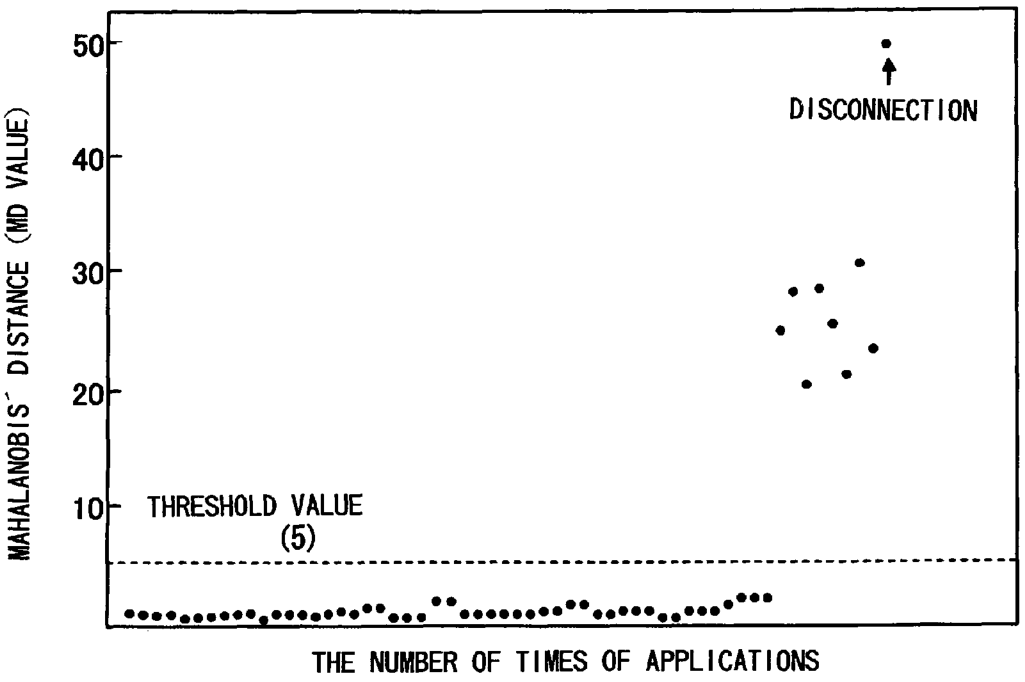
FIG. 12 is a graph showing a transition for number of times of applications, with respect to the MD value of the maximum value and the sum of squares of residuals, of the electric power supplied to all of the heater wires during the temperature rising period.

FIG. 12 shows a transition for each number of times of applications with respect to the MD value 316 corresponding to the maximum values and sums of squares of residuals of the supplied electric power of the respective heater wires 132A to 132E during the temperature rising period. As shown in FIG. 12, as the number of times of applications of the heating apparatus 100 is increased and reaches a certain value, the MD value 316 is suddenly increased. This phenomenon can be regarded as the sign of disconnection of any of the heater wires 132A to 132E. In fact, in an example shown in FIG. 12, any of the heater wires 132A to 132E was disconnected during an eighth application after the MD value 316 was suddenly increased.

In this embodiment, in order to judge such sudden increase of the MD value 316, a threshold value is provided to the MD value as a judging criterion. Because the MD value has higher probability that it will be changed depending on the heating condition as with the maximum value and/or sum of squares of residuals of the supplied electric power in the first embodiment, it is preferred to set the threshold value, taking into account the heating condition. For example, under the heating condition that the temperature in the processing chamber 122 is elevated from 650° C. to 900° C. during the temperature rising period of 25 minutes, the threshold value is set at, for example, "5".

Thereafter, whether or not the MD value exceeds the threshold value is judged in a step S240. If the MD value is not greater than the threshold value, all of the heater wires 132A to 132E are judged to have no sign of disconnection and regarded as normal ones. Thus, the life estimation process for the heater wires in this application will be ended.

Contrary, if the MD value exceeds the threshold value, one can reach judgment that there is degradation in any of the heater wires 132A to 132E. Thus, the life alarming process for giving notice that any of the heater wires is approaching the end of the life is performed in a step S250. More specifically, as the life alarming process for the heater wires, for example, the alarm means 270, such as a buzzer or the like, is actuated, or otherwise a message that, for example, the heater wire 132A is nearing the end of its life is displayed on the display means 250. Thereafter, the control unit 200 will stop the life estimation process for the heater wires in this application (or batch process).

With such a life alarming process, an operator of the heating apparatus 100 can prepare for exchanging parts of, for example, the entire heater 130, and make the maintenance schedule for the exchange in the heating apparatus 100. The second embodiment is designed to achieve an early-stage life estimation for the heater 130. Thus, according to this embodiment, none of the heater wires 132A to 132E will be disconnected immediately after the life alarming process. In fact, it was found that any of the heater wires will be disconnected after the heating process is further performed, for example, five to eight times, after the alarming process was carried out. Accordingly, since a procedure for the maintenance and preparations for exchanging parts can be performed with plenty of time, the operator can carry out smooth maintenance work for the heating apparatus 100.

As described above, according to the second embodiment, by utilizing the data of the temperature rising period, in which the sign of disconnection of the heater wires 132A to 132E is likely to be seen, the life of the entire heater 130 can be estimated, more appropriately and in an earlier period, than conventional. Additionally, according to the second embodiment, once the MD model 310 is prepared, further obtainment of the index (e.g., the MD value) for estimating the life of the heater 130 can be facilitated, only by inputting the maximum values 312A to 312E and the sums of squares of residuals 314A to 314E of the supplied electric power of the respective heater wires 132A to 132E during the temperature rising period into the MD model 310. Consequently, the life of the heater 130 can be appropriately estimated based on the index.

Since the plurality of heater wires 132A to 132E are located adjacent to one another in the heater 130, when degradation or deterioration of a certain heater wire progresses, some influence will be exerted on the electric power supplied to the heater wires adjacent to the degraded heater wire. For example, when degradation of the heater wire 132B occurs, the temperature of the heating zone corresponding to the heater wire 132B cannot be appropriately controlled. In such a case, the adjacent heater wires 132A and 132C will be actuated to compensate for the functional deterioration of the heater wire 132B. Thus, the maximum values and sums of squares of residuals of the supplied electric power of the respective heater wires 132A and 132C will be greater respectively than those under a normal condition (or in a steady state) even though they are not substantially degraded.

Accordingly, in the case in which the plurality of heater wires 132A to 132E are arranged adjacent to one another, the life estimation of the entire heater 130 can be performed more appropriately, in the life estimation process according to the second embodiment which carries out the multi-variate analysis, collectively, at a time, for the plurality of heater wires 132A to 132E by using the maximum values and sums of squares of residuals of the respective heater wires 132A to 132E as the variables for the analysis, than in the life estimation process which carries out the single-variate analysis, individually, for the plurality of heater wires 132A to 132E, as described in the first embodiment.

While, in the second embodiment, a case, in which the multi-variate analysis using all of the maximum values and sums of squares of residuals of the five heater wires 132A to 132E as the ten variables for the analysis is carried out, in order to estimate the life of the entire heater 130 from the result obtained by the multi-variate analysis, has been discussed, the way for the estimation is not limited to this aspect.

For instance, the MD model 310 may be prepared for each heater wire 132A to 132E, so as to analyze the two variables, i.e., the maximum value and the sum of squares of residuals of the supplied electric power of each heater wire 132A to 132E during the temperature rising period and thus obtain the MD value for each heater wire 132A to 132E. In this case, the life can be estimated for each heater wire 132A to 132E. If each heater 132A to 132E can be individually exchanged in the heater 130, it is preferred to separately estimate the life of each heater wire 132A to 132E.

While, in the first and second embodiments, a case, in which the life estimation for the heater wires related to the present invention is applied to the vertical-type heating apparatus 100 adapted for providing the batch process to the plurality of wafers W and shown in FIG. 1, has been discussed, the application is not limited to this aspect, the life estimation described herein may be applied to various types of heating apparatuses.

(Another Example of Construction of the Heating Apparatus)

Figure 13:
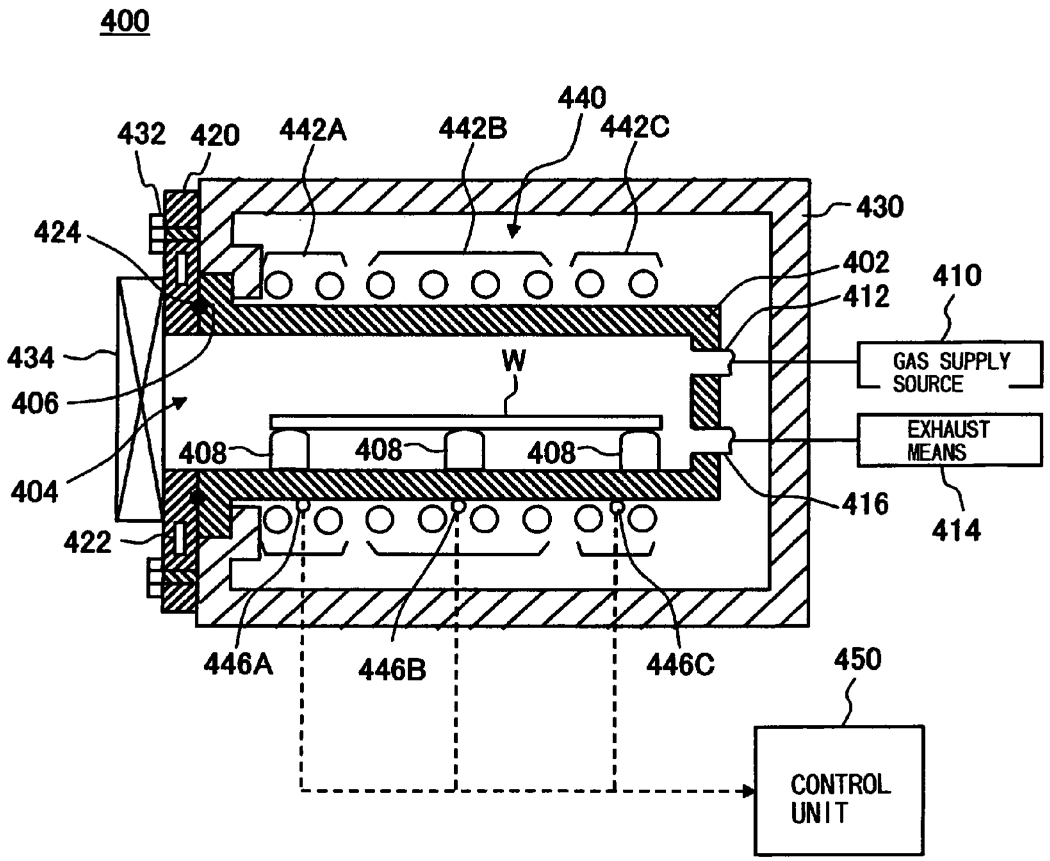
FIG. 13 is a longitudinal cross section showing one example of general construction of another vertical-type heating apparatus, to which the present invention can be applied.
Figure 14:
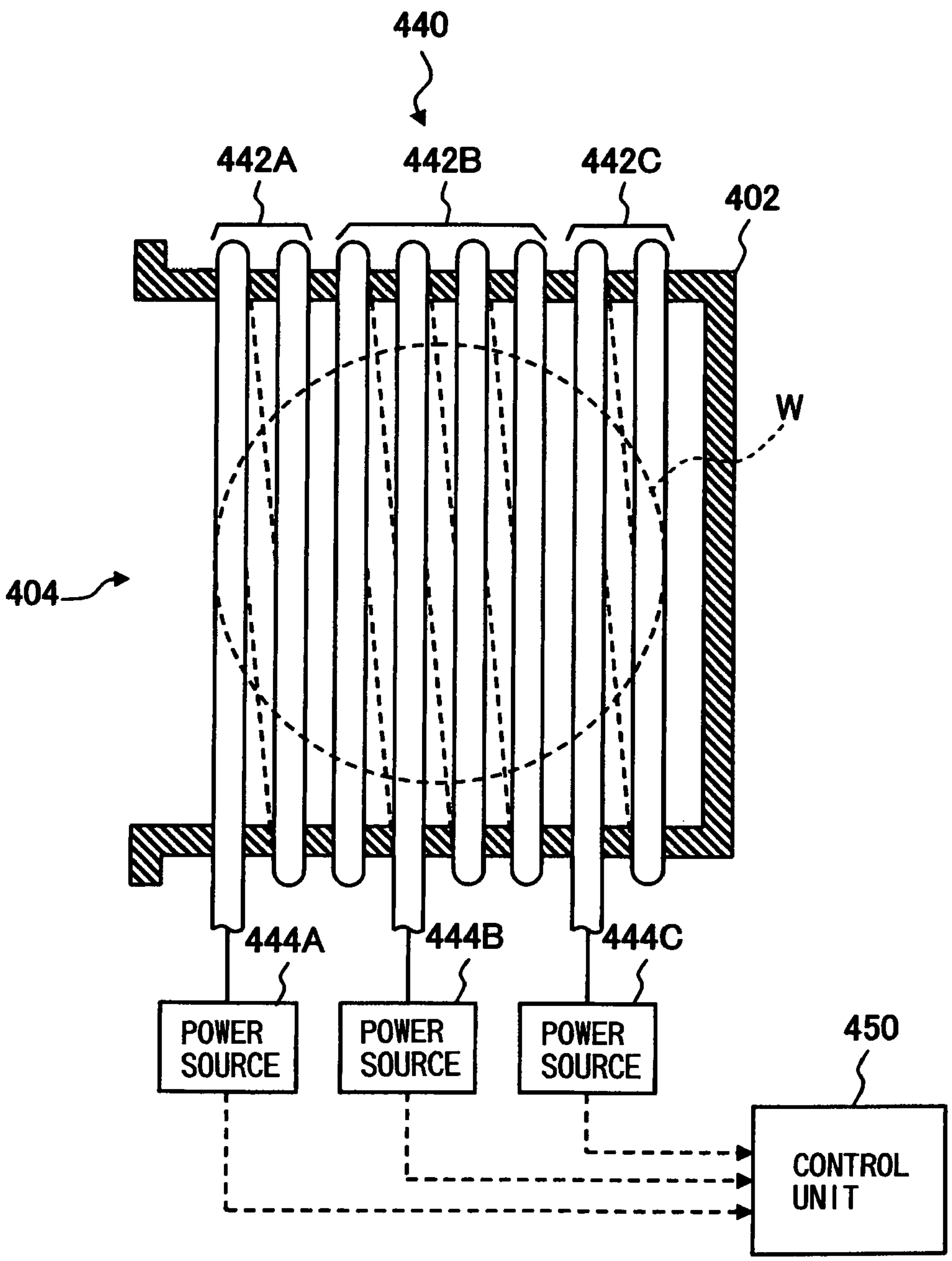
FIG. 14 is a plan view showing one example of construction of a heater provided in the heating apparatus shown in FIG. 13.
Figure 15:
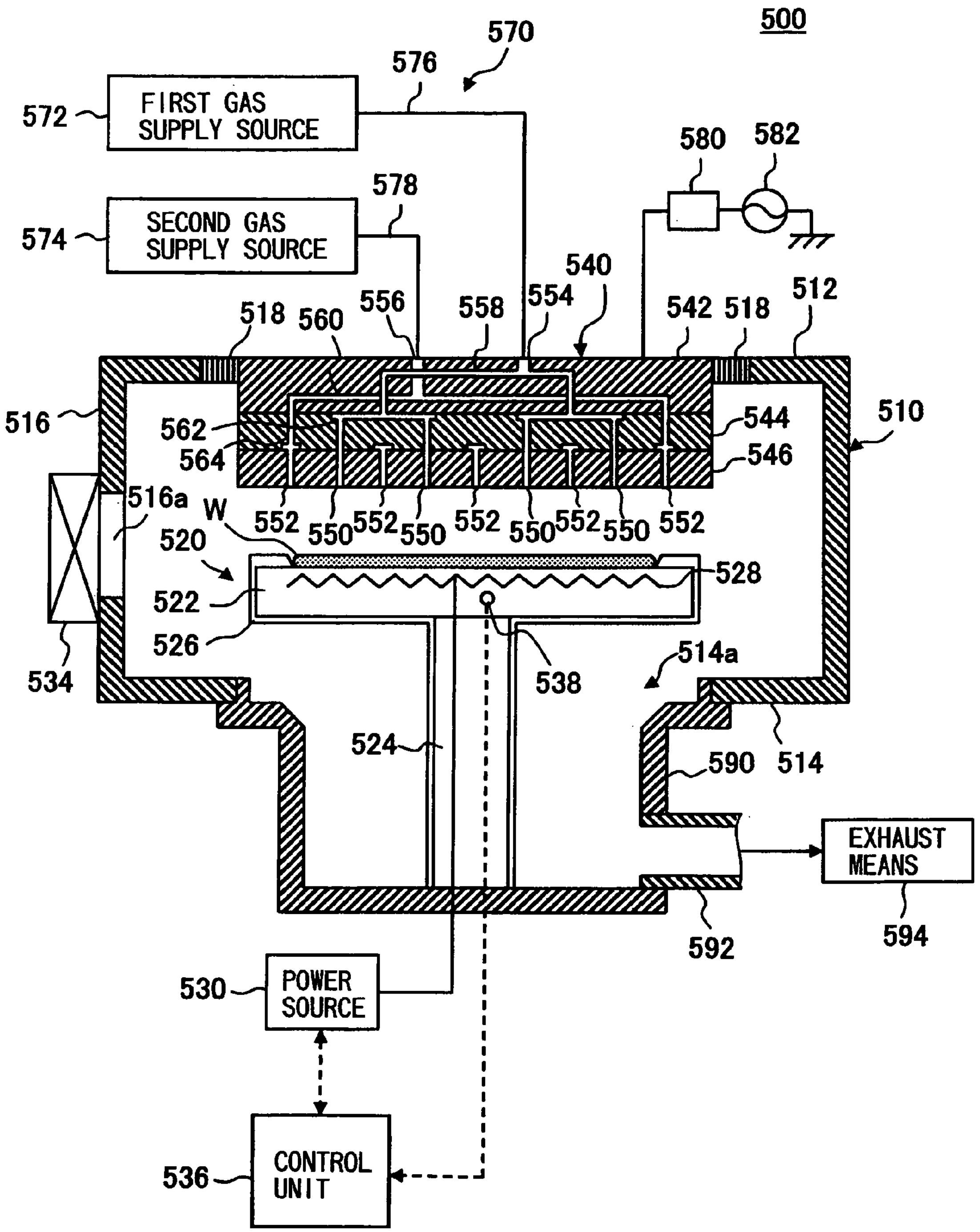
FIG. 15 is a longitudinal cross section showing one example of general construction of still another heating apparatus, to which the present invention can be applied.

Next, another example of construction of the heating apparatus, to which the life estimation for the heater wires related to the above embodiments of this invention can be applied, will be described with reference to the drawings. FIGS. 13 to 15 respectively show schematic construction of a sheet-feeding type heating apparatus to which the present invention can be applied.

First, referring to the drawings, the sheet-feeding type heating apparatus 400, having a plurality heating zones each allocated along and relative to faces of the wafer W, will be described. FIG. 13 is a longitudinal cross section showing one example of general construction of the vertical-type heating apparatus 400, and FIG. 14 is a plan view showing configuration of a heater 440 provided in the heating apparatus 400 shown in FIG. 13. According to the heating apparatus 400 including such a plurality of heating zones, a higher uniformity of in-plane temperature of the wafer W can be achieved. For example, the heating apparatus of this type is suitable for a heating process for the wafer W having a larger diametrical size.

As shown in FIG. 13, the heating apparatus 400 includes a processing vessel 402 formed from, for example, quartz and having, for example, a rectangular shape. In one side wall of the processing vessel 402, an opening 404 for introducing the wafer W into the vessel is formed. A flange portion 406 is provided at the periphery of the opening 404.

From a bottom portion in the processing vessel 402, a plurality of projections 408 formed from quartz extend upward while being arranged along a circle. By advancing a pick of a carrier arm holding the wafer into the processing vessel 402 from the opening 404 and then lowering it toward the projections 408, the periphery of the rear face of the wafer W will be in contact with a distal end of each projection 408. Thus, the wafer W can be supported on the projections 408.

In the processing vessel 402, a gas supply source 410 for supplying a predetermined processing gas into the processing vessel 402 is connected, via a gas supplying pipe 412, to a side wall opposed to the opening 404. In addition, an exhaust means 414, for example, for evacuating an atmosphere in the processing vessel 402, is connected, via an exhaust pipe 416, to the side wall opposed to the opening 404.

A cooling plate 420 is provided to an end face of the opening 404 such that it can be in contact with the flange portion 406. In the cooling plate 420, a cooling water passage 422 for flowing cooling water therethrough is provided in order to cool a sealing portion 424, such as an O-ring, provided between the cooling plate 420 and the flange portion 406. The cooling plate 420 is fastened and fixed to a casing 430 formed from, for example, aluminum, and surrounding the outside of the processing vessel 402, via bolts 432 or the like. Thus, the flange portion 406 is also fixed to an end portion of the casing 430. A gate valve 434 configured to be airtightly opened and closed upon carrying in and carrying out the wafer W is provided to the opening 404.

A heater 440 adapted for heating the wafer W carried into the processing vessel 402 is provided to an outer wall of the processing vessel 402. The heater 440 includes heater wires 442A to 442C each composed of a resistance heating material wired to be wound around the outer wall of the processing vessel 402.

As shown in FIG. 14, power sources 444A to 444C are respectively connected with the heater wires 442A to 442C, such that electric power can be supplied independently to each heater wire 442A to 442C from each power source 444A to 444C, in accordance with a control signal from a control unit 450 for controlling the entire operation of the heating apparatus 400 itself. Consequently, each heater wire 442A to 442C can generate heat corresponding to the supplied electric power.

As shown in FIG. 13, temperature sensors 446A to 446B are provided to the outer wall of the processing vessel 402, corresponding to each heating zone. Each temperature sensor 446A to 446C is composed of, for example, a thermocouple. The temperature sensors may also be provided to an inner wall of the processing vessel 402, corresponding to each heating zone. Thus, the control unit 450 can obtain temperature information, for each heating zone, by using each temperature sensor 446A to 446C.

With such a heater 440, the interior the processing vessel 402 can be heated, respectively corresponding to the three zones divided therein. Consequently, the temperature in the processing vessel 402 during the heating process can be kept uniformly, as such providing the heating process to the wafer W without unevenness of the in-plane temperature thereof.

The control unit 450 collects data of the electric power supplied to each heater wire 442A to 442C from each power source 444A to 444C, so as to estimate the life of each heater wire 442A to 442C based on the collected electric power data, in the same manner as in the first and second embodiments.

Next, a plasma CVD apparatus 500, as the sheet-feeding type heating apparatus adapted for providing the heating process to the wafer W by using a single heater wire, will be described with reference to the drawings. FIG. 15 is a longitudinal cross section showing one example of general construction of the plasma CVD apparatus 500.

As shown in FIG. 15, the plasma CVD apparatus 500 includes a generally cylindrical processing chamber 510 that is airtightly constructed. The processing chamber 510 is configured to contain the wafer W therein, such that a film forming process can be provided to the wafer W, by using a plasma CVD method adapted for forming a film, such as a TiN (i.e., titanium nitride) film, on the wafer W.

A wafer table 520 adapted for horizontally supporting the wafer W thereon is located in the processing chamber 510. The wafer table 520 includes a table main body 522 on which the wafer W is placed, a cylindrical column 524 adapted for supporting the table main body 522, and a cover 526 adapted for covering the table main body 522 and column 524. The table main body 522, column 524 and cover 526 are respectively formed from a material, for example, quartz, that is not likely to be corroded by organic acids and has higher heat resistance.

The wafer table 520 includes a wafer supporting mechanism (not shown) adapted to support and optionally elevate and lower the wafer W in order to receive the wafer W from a carrier mechanism (not shown) as well as transfer it to the carrier mechanism. The wafer supporting mechanism includes, for example, three, wafer supporting pins (lifter pins), each configured to be projected from and retracted into a surface of the table main body 522, via through-holes formed therein.

A shower head 540 is provided to a ceiling wall 512 of the processing chamber 510, via an insulating member 518. The shower head 540 is composed of an upper-stage block member 542, an intermediate-stage block member 544, and a lower-stage block member 546.

In the lower-stage block member 546, first gas injection ports 550 for injecting a first processing gas and second gas injection ports 552 for injecting a second processing gas are formed alternately. In a top face of the upper-stage block member 542, a first gas introducing port 554 for introducing the first processing gas and a second gas introducing port 556 for introducing the second processing gas are formed, respectively.

In the upper-stage block member 542, multiple first upper-stage gas passages 558, each extending horizontally and vertically after branched from the first gas introducing port 554, and multiple second upper-stage passages 560, each extending horizontally and vertically after branched from the second gas introducing port 556, are formed, respectively. In the intermediate-stage block member 544, multiple first intermediate-stage gas passages 562, each extending horizontally and vertically while being in communication with each first upper-stage gas passage 558, and multiple second intermediate-stage passages 560, each extending horizontally and vertically while being in communication with each second upper-stage gas passage 560, are formed, respectively. Further, each first intermediate-stage gas passage 562 is in communication with each first gas injection port 550, while each second intermediate-stage gas passage 564 is in communication with each second gas injection port 552.

Additionally, the plasma CVD apparatus 500 includes a gas supplying means 570. The gas supplying means 570 includes a first gas supply source 572 and a second gas supply source 574. The first gas supply source 572 includes, for example, a $ClF_3$ gas supply source for supplying a $ClF_3$ gas, a $TiCl_4$ gas supply source for supplying a $TiCl_4$ gas, a $N_2$ gas supply source for supplying a $N_2$ gas, and the like. The second gas supply source 574 includes, for example, another $N_2$ gas supply source, a $NH_3$ gas supply source for supplying a $NH_3$ gas, and the like.

The first gas supply source 572 is connected with the first gas introducing port 554 formed in the upper-stage block member 542 of the shower head 540 via a first gas supply line 576, while the second gas supply source 574 is connected with the second gas introducing port 556 formed in the upper-stage block member 542 of the shower head 540 via a second gas supply line 578. The first gas supply line 576 and the second gas supply line 578 are respectively provided with, for example, a valve and/or mass flow controller (not shown), for enabling control of a flow amount of each gas.

With such configuration, when a gas, for example, the $ClF_3$ gas, is supplied from the first gas supply source 572, the $ClF_3$ gas is introduced into the shower head 540 via the first gas supply line 576 and the first gas introducing port 554 of the shower head 540, then reaches the first gas injection port 550 via the first upper-stage gas passage 558 and the first intermediate-stage gas passage 562, and is injected into the processing chamber 510. Similarly, when a gas, for example, the $N_2$ gas, is supplied from the second gas supply source 574, the $N_2$ gas is introduced into the shower head 540 via the second gas supply line 578 and the second gas introducing port 556 of the shower head 540, then reaches the second gas injection port 560 via the second upper-stage gas passage 560 and the second intermediate-stage gas passage 564, and is injected into the processing chamber 510.

The shower head 540 related to this embodiment is of a post-mix type that the gas supplied from the first gas supply source 572 and the gas supplied from the second gas supply source 574 are independently injected into the processing chamber 510. Therefore, it should be appreciated that two kinds of gases can be supplied at the same time into the processing chamber 510 during a process, while they may also be supplied alternately, or otherwise only one of them may also be supplied. In addition, it is contemplated that the shower head of a pre-mix type may also be used in place of the post-mix type shower head 540.

To the shower head 540, a high frequency power source 582 is connected via a matching circuit 580. When high frequency electric power is supplied to the shower head 582 from the high frequency power source 582, the processing gas supplied into the processing chamber 510 via the shower head 540 is changed into plasma, thereby forming a predetermined film on the wafer W.

A circular opening 514*a* is formed in a central portion of a bottom wall 514 of the processing chamber 510, and a downwardly projecting exhaust chamber 590 is connected with the bottom wall 514 such that it covers the opening 514*a*. An exhaust means 594 is connected to a side wall of the exhaust chamber 590 via an exhaust pipe 592. With actuation of the exhaust pipe 594, the interior of the processing chamber 510 can be evacuated to a predetermined degree of vacuum.

To a side wall 516 of the processing chamber 510, a transfer port 516*a* adapted for carrying in and carrying out the wafer W relative to the processing chamber 510, and a gate valve 534 adapted for opening and closing the transfer port 516*a* are provided.

In the table main body 522 constituting the wafer table 520, a heater wire 528 composed of a resistance heating material is embedded. A power source 530 is connected with the heater wire 528, such that the heater wire 528 can generate heat in response to the electric power supplied thereto from the power source 530, in accordance with a control signal from a control unit 536 adapted for controlling the entire operation of the plasma CVD apparatus 500.

Additionally, a temperature sensor 538 is embedded in the table main body 522. The temperature sensor 538 is composed of, for example, a thermocouple. The control unit 536 can obtain temperature information of the table main body 522 including the temperature information of the wafer W, by using the temperature sensor 538.

The control unit 536 collects data of the electric power supplied to the heater wire 528 from the power source 530, so as to estimate the life of the heater wire 528 based on the collected electric power data, as discussed in the first and second embodiments. Thus, according to this embodiment, the life of the heater wire used in the heating process can be appropriately estimated, even in the case of using the feet-feeding type heating apparatus, rather than using the vertical-type heating apparatus.

As stated above, in the first and second embodiments, the case of estimating the life of the heater wire by using electrical data during the temperature rising period has been discussed by way of example. This is because, if the heater wire is not yet disconnected, the sign of disconnection of the heater wire is more likely appear in the electrical data obtained during the temperature rising period (e.g., the time t1 to t2 shown in FIG. 4) than during the stabilized temperature period. In this case, the temperature rising period is provided for elevating the temperature in the heating apparatus up to a predetermined temperature suitable for the heating process after the wafer is carried in the apparatus. However, the life estimation process is not limited to such a method. For instance, data obtained during other periods, in which the sign of disconnection of the heater wire is more likely to appear than the stabilized temperature period, may also be used.

For example, also in the case of using the data obtained during the carrying-in period (e.g., the time t0 to t1 shown in FIG. 4), in which the wafer or wafers W are carried in the processing chamber, the sign of disconnection of the heater wire is more likely to be seen than the stabilized temperature period. Accordingly, the life of the heater wire may also be estimated based on the carrying-in period of the wafer W. With respect to such life estimation for the heater wire by utilizing the data obtained during the carrying-in period of the wafer W will be detailed below, by way of a specific example related to a third embodiment.

Life Estimation of the Heater Wire According to the Third Embodiment

Hereinafter, the life estimation for the heater wire according to the third embodiment will be described. With respect to this embodiment, a case in which the life of the heater wire is estimated, based on temperature data of the heater wire obtained during the carrying-in period of the wafers W, by using, for example, the vertical-type heating apparatus 100 as shown in FIG. 1, will be discussed. As described above, the carrying-in period of the wafers W is used as the period in which the sign of disconnection of the heater wire is more likely to appear than the stabilized temperature period. More specifically, the carrying-in period of the wafers W substantially corresponds to a period (or loading period) in which the wafer boat 114 holding the plurality of wafers W is carried in the processing chamber 122.

For example, during the carrying-in period of from t0 to t1 for the wafers W as shown in FIG. 4, the shutter (not shown) covering the bottom end opening 123 of the processing chamber 122 is once opened to enable the wafer boat 114 to be carried into the processing chamber 122, and then the processing chamber 122 is closed again by the cover 116 after the wafer boat 114 is carried into the processing chamber 114. Thus, the temperature in the vicinity of the bottom end opening 123 in the processing chamber 122 will be greatly changed. Therefore, in order to keep the temperature in the processing chamber 122 constant, the electric power to be supplied to the heater wire should be increased, thus rendering the sign of disconnection of the heater wire more likely to appear. Furthermore, as described above, the temperature change becomes greater as one moves nearer to the bottom end opening 123. Accordingly, the electric power supplied to the lowest heater wire 132E located nearest to the bottom end opening 123 should be greatest. Therefore, the temperature change of the heater wire 132E will also be more conspicuous, as such making it easier to detect the sign of disconnection.

Figure 16A:
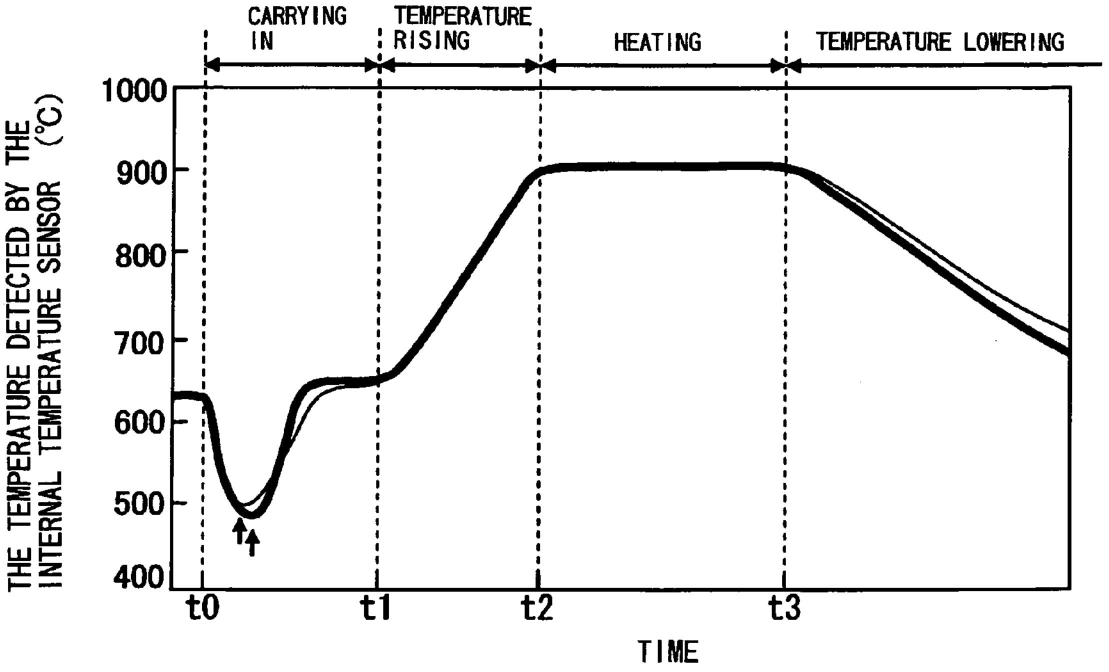
FIG. 16A is a profile showing a transition of temperature in the processing chamber, the temperature being detected by an internal temperature sensor located in a position nearest to a bottom end opening of the processing chamber, in each step performed by the heating apparatus shown in FIG. 1.
Figure 16B:
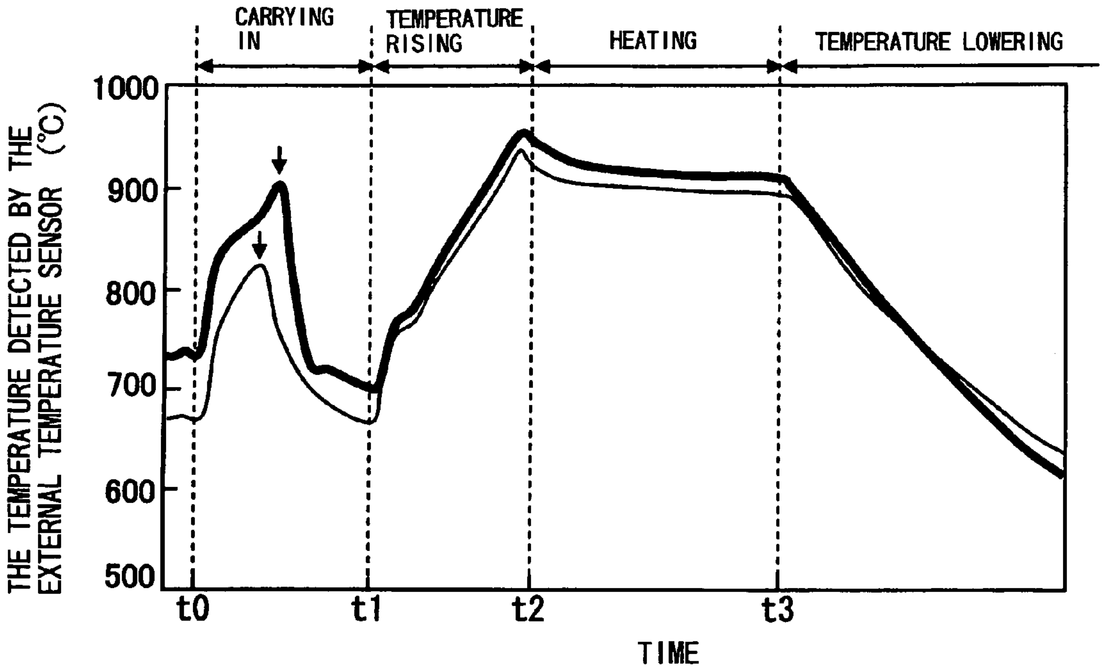
FIG. 16B is a profile showing a transition of temperature of the heater wire, the temperature being detected by an external temperature sensor located in a position nearest to the bottom end opening of the processing chamber, in each step performed by the heating apparatus shown in FIG. 1.

Now, with respect to the temperature of the heater wire 132E located lowest as described above, and the temperature of the atmosphere in the processing chamber 122 heated by the heater wire 132E, a transition in the series of steps (applications) including the carrying-in period of the wafers W shown in FIG. 4 will be described with reference to the drawings. FIG. 16A is a profile, showing the transition of temperature of the atmosphere in the processing chamber 122, in each step shown in FIG. 4, and more specifically, it shows a graph of the temperature detected by the internal temperature sensor 138E located lowest in the processing chamber 122. FIG. 16B is a profile, showing the transition of temperature of the heater wire 132E located lowest, in each step shown in FIG. 4, and more specifically, it shows a graph of the temperature detected by the external temperature sensor 136E located lowest in the processing chamber 122.

In FIGS. 16A and 16B, only the wafer-carrying-in period of t0 to t1, heating period of t2 to t3 and temperature lowering period after t3, of the periods provided for performing the respective steps shown in FIG. 4, are shown in each graph, and the wafer-carrying-out period is omitted. The graph depicted by a thin line in each of FIGS. 16A, 16B shows a profile of temperature data of the heater wire 132E not yet degraded and in a normal condition because it is just after exchanged, while a thick line shows a profile of the temperature data of the heater wire 132E in a state in which the degradation is substantially progressed.

As shown in FIGS. 16A, 16B, in the wafer-carrying-in period of from t0 to t1, the shutter (not shown) covering the bottom end opening 123 of the processing chamber 122 is opened at the time t0, and the wafer boat 114 is then lifted up and carried into the processing chamber 122. At this time, the internal space of the processing chamber 122 and the external space of the processing chamber 122 in the vicinity of the bottom end opening 123 is in communication with each other. Thus, as shown in FIG. 16A, the temperature in the processing chamber 122 is suddenly lowered due to the influence of the atmosphere of the external space having a relatively low temperature.

Therefore, in order to keep the temperature in the processing chamber 122 at a preset temperature (e.g., 650° C.), the electric power supplied to, for example, the heater wire 132E, from the power source 134E, is controlled, as shown in FIG. 16B, as such suddenly elevating the temperature of the heater wire 132E. Simultaneously, while the electric power supplied to the other heater wires 132A to 132D is also controlled, the electric power supplied to the heater wire 132E, which is nearest to the bottom end opening 123 of the processing chamber 122 and the temperature lowering of which is the most conspicuous, will be, for example, the rated power (or the maximum electric power). Thus, it becomes far greater than the electric power supplied to the other heater wires 132A to 132E.

In this manner, since the electric power supplied to, for example, the heater wire 132, is controlled to be significantly greater, once the wafer boat 114 completely enters the processing chamber 122 and the bottom end opening 123 is shut off by the cover 116, the temperature in the processing chamber 122 will be suddenly raised and returned to the preset temperature.

Thereafter, when the temperature in the processing chamber 122 is returned to, for example, 650° C., as shown in FIG. 16A, it is elevated up to the heating temperature (e.g., 900° C.) during the temperature rising period of from t1 to t2. Subsequently, the temperature in the processing chamber 122 is kept at the heating temperature during the heating period of from t2 to t3, while the heating process is provided to the wafers W. Thereafter, when the heating process is completed, the temperature in the processing chamber 122 is lowered again up to 650° C. during the temperature lowering period after the time t3. Then, the carrying-out step of the wafers W is performed during the wafer-carrying-out period, thus ending the series of steps (applications).

In the respective temperature changes shown in FIGS. 16A, 16B, when comparing the temperature change of the normal heater wire 132E (depicted by the thin line in the graph) and the temperature change of the degrading heater wire 132E (depicted by the thick line in the graph) during the wafer-carrying-in period of from t0 to t1, it is found that, while showing some differences in the lowering amount and rising timing of the temperature, there is almost no change in the temperature change in the processing chamber 122 (or temperature change detected by the internal temperature sensor 138E), as shown in FIG. 16A. This is because, when the heater wire 132E is degraded, its ability to response will be deteriorated as compared with that under the normal condition, as such the timing at which the temperature is most lowered will also be delayed as compared with that under the normal condition. However, since such delay of the timing can be compensated for by the other heater wires 132A to 132D, the influence of the degradation cannot be seen distinctly in the temperature change in the processing chamber 122.

Contrary, when observing the temperature change of the heater wire 132E during the wafer-carrying-in period of from t0 to t1 shown in FIG. 16B (or temperature change detected by the external temperature sensor 136E), it is found that the temperature change of the degrading heater wire 132E (depicted by the thick line in the graph) tends to be shifted more than a predetermined temperature range (approximately 50° C. in FIG. 16B) as compared with the temperature change of the normal heater wire 132E (depicted by the thin line in the graph). This is because the temperature change detected by the external temperature sensor 136E is directly reflected by a condition of heat generation due to the heater wire 132E, thus conspicuously demonstrating a state of degradation. Accordingly, with detection of the tendency or trend of the shift in the temperature data of the heater wire 132E during the carrying-in period of the wafers W, the degradation of the heater wire can be judged.

As described above, during the wafer-carrying-in period, the greatest electric power, for example, the rated power (or maximum electric power) is temporarily supplied to the heater wire 132E, and this operation will be repeated for each wafer-carrying-in period. Therefore, the probability that the heater wire 132E will be degraded in an earlier period than that of the other heater wires 132A to 132E is significantly high. Accordingly, by utilizing the temperature data of the heater wire 132E that is most likely to be degraded during the carrying-in period of the wafers W, the life estimation can be carried out in an earlier period and more appropriately.

Therefore, in the third embodiment, the life estimation for the heater wire or wires is carried out by using the temperature data (or temperature data detected by the external temperature sensor 136E) of the heater wire 132E during the carrying-in period of the wafers W, in which period the sign of disconnection being more likely to be seen as with the temperature rising period. More specifically, by observing the transition of the maximum values (i.e., each value designated by an arrow in FIG. 16B) of the temperature data detected by the external temperature sensor 136E during the carrying-in period (t0 to t1) of the wafers W for each application as well as by detecting the trend of the shift in the maximum value, the trend of the shift in the whole temperature data of the heater wire 132E during the carrying-in period of the wafers W can be detected, thereby judging whether or not there is the sign of disconnection of the heater wire 132E.

(One Specific Example of the Life Estimation for the Heater Wire)

Figure 17:
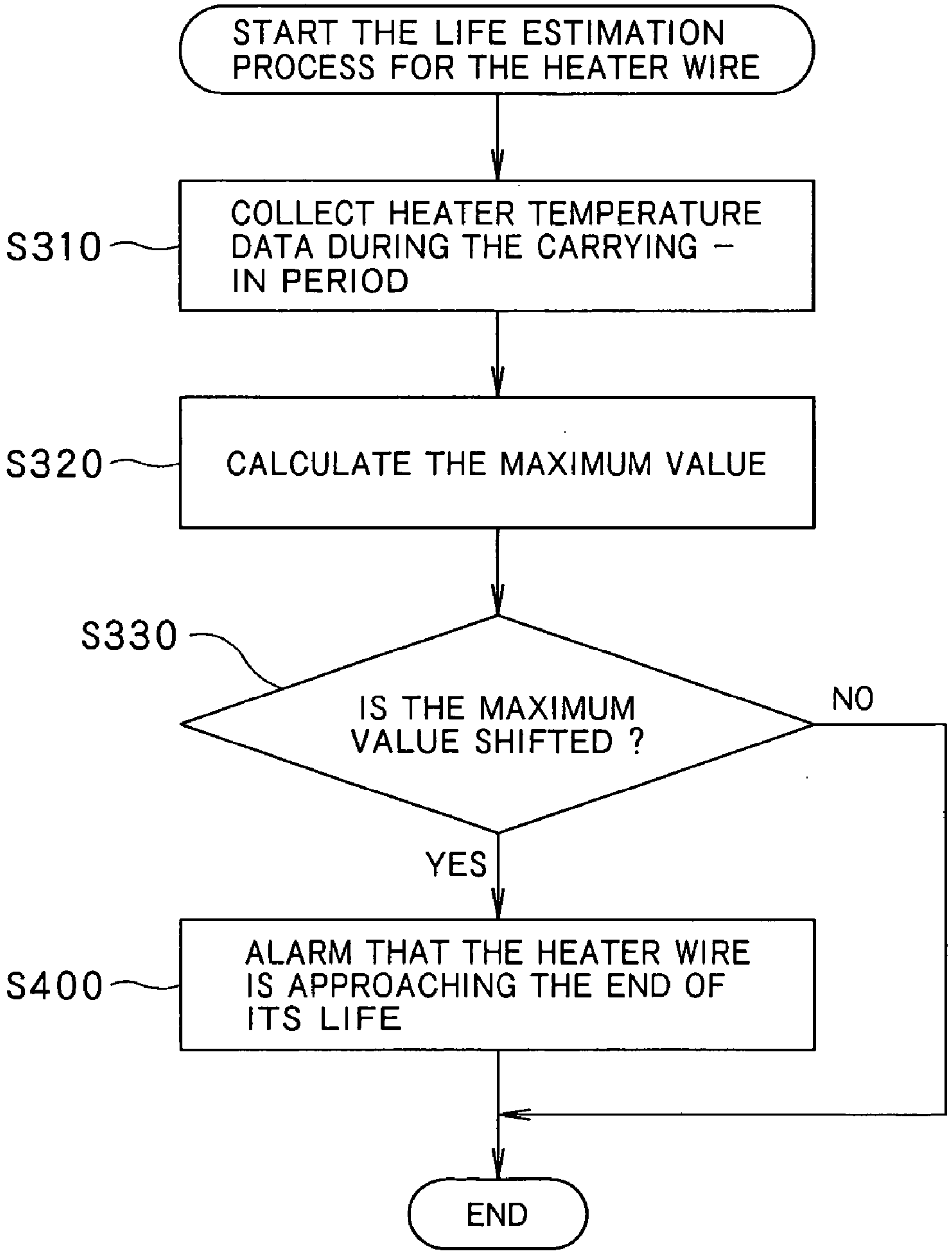
FIG. 17 is a flow chart showing a specific example of the life estimation process related to a third embodiment of the present invention.

Now, one specific example of the life estimation for the heater wire related to the third embodiment using the temperature data (or temperature data detected by the external temperature sensor 136E) of the heater wire 132E as described above will be described with reference to the drawings. FIG. 17 is a flow chart showing the specific example of the life estimation process for the heater wire related to the third embodiment. This life estimation process related to the third embodiment is performed by the control unit 200, based on a determined program, each time the application (or batch process) of the heating process for the plurality of wafers W is carried out in the heating apparatus 100.

First, in a step S310, the temperature data of the heater wire is collected from the external temperature sensor 136E. At this time, the temperature data is collected from the external temperature sensor 136E, at least during the carrying-in period of from t0 to t1 of the whole period over the one application of the heating apparatus 100. Then, the collected temperature data is stored in the storage means 280.

Subsequently, in a step S320, the maximum value of the temperature data detected by the external temperature sensor 136E during the carrying-in period of the wafers W (hereinafter, also referred as “the maximum value of the temperature data”) among the collected temperature data is obtained. For example, in the example shown in FIG. 16B, the maximum value of the temperature data, in the case in which the heater wire 132E is not yet degraded (i.e., the case depicted by the thin line in the graph), is approximately 830° C. Contrary, in the case in which the heater wire 132E is degrading (i.e., the case depicted by the thick line in the graph), the maximum value of the temperature data is approximately 910° C. These maximum values of the temperature data are respectively stored in the storage means 280 as the operational result data 286.

In this way, the control unit 200 performs the step S320 each time the carrying-in process for the plurality of wafers W into the processing chamber 122 in the application (or batch process) of the heating apparatus 100 is carried out, so as to calculate the maximum value of the temperature data during the carrying-in period. Consequently, the transition for each application can be grasped, with respect to the maximum value of the temperature data during the carrying-in period.

Figure 18:
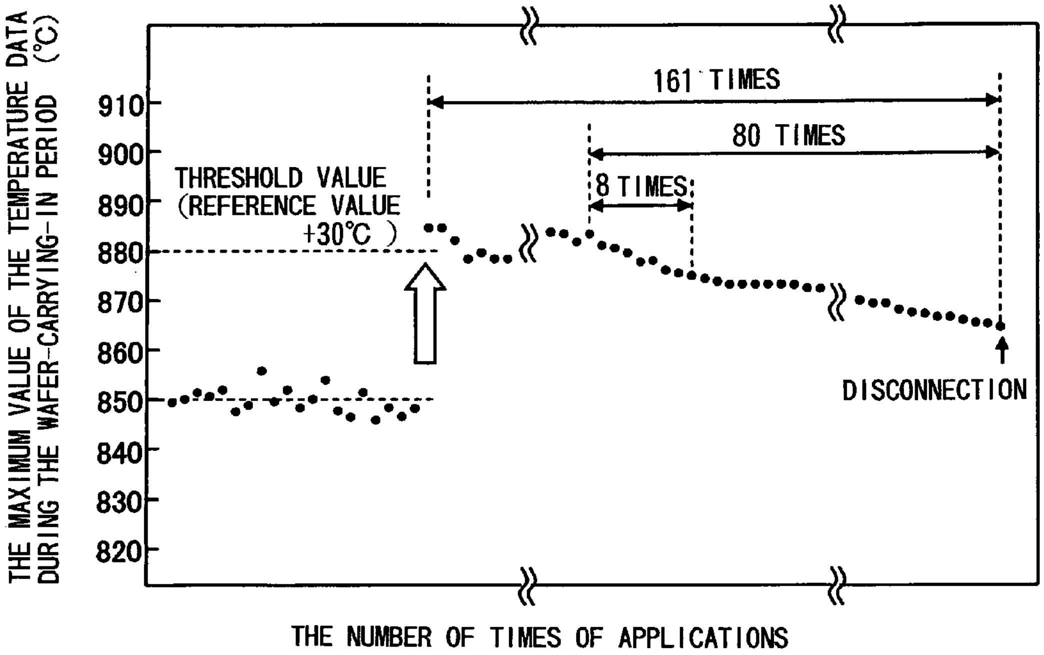
FIG. 18 is a graph showing a transition for each number of times of applications, with respect to the maximum value of temperature data detected during a wafer-carrying-in period.

FIG. 18 shows the maximum value of the temperature data during the carrying-in period and the transition for each number of times of applications of the heating apparatus 100. As shown in FIG. 18, as the number of times of applications of the heating apparatus 100 is increased and reaches a certain value, the maximum value of the temperature data is shifted to a value higher by one level. This shift can be regarded as the sign of disconnection of the heater wire 132E. In fact, in an example shown in FIG. 18, the heater wire 132A was disconnected during a 161st application after the maximum value of the temperature data was shifted to the value higher by one level.

Therefore, whether or not the maximum value of the temperature is shifted is judged in a next step S330. More specifically, a threshold value of the maximum value of the temperature data is first set, and whether or not the maximum value of the temperature data is shifted is then judged based on the threshold value. If there is no degradation in the heater wire 132E and if there is no change of the preset value (e.g., 650° C.) in the processing chamber during the carrying-in period, the maximum value of the temperature data will be substantially constant for every application. In the example shown in FIG. 18, the maximum value of the temperature data in the case in which there is no degradation in the heater wire 132E is within a range of ±10° C., based on a reference value of 850° C. Accordingly, the threshold value of the maximum value of the temperature data is set higher, by, for example, 30° C., than the reference value, taking into account the variation of approximately ±10° C. For instance, in the case in which the reference value is 850° C., the threshold value is set at 880° C. As the reference value, for example, when the heater wire 132E is just after exchanged and in a normal state, an average obtained by sampling several maximum values of the temperature data may be used.

Rather than using such a fixed reference value as described above, the reference value may be updated for the maximum value detected in each application. In this case, how the maximum value of the temperature data detected in the application of a certain number of times is raised from the maximum value of the temperature data detected in the application of the previous number of times is detected, so as to judge presence or absence of a shifting phenomenon of the maximum value of the temperature data, based on whether or not the raised amount exceeds a predetermined threshold value.

Additionally, in the third embodiment, if the maximum value of the temperature data detected in the application of a certain number of times exceeds the threshold value, this maximum value of the temperature data is judged to be substantially shifted, and the result of this judgment is stored in the storage means 280. Then, in subsequent applications, even in the case in which the detected maximum value of the temperature data does not reach the threshold value, such a maximum value of the temperature data will also be judged to be shifted, in the step S330.

In this case, for example, shift judgment data (e.g., data expressed by "0" or "1" due to a flag or the like) is stored in the storage means 280, so as to judge presence or absence of the shift, based on the value of the shift judgment data. More specifically, the shift data is stored as "0" when the maximum value of the temperature data is judged not to be shifted, while stored as "1" when the maximum value of the temperature data is judged to be shifted. For example, when the heater 130 is changed to a new one, the data "1" will be returned to "0". In this case, if the shift judgment data has already been determined as "1" in the step S330, the maximum value of the temperature data detected in the subsequent applications will be judged to be shifted even though it does not reach the threshold value.

In this manner, in the step S330, once whether or not the maximum value of the temperature data was shifted is judged and judgment that it was not shifted is made, the heater wire 132E is judged not to have the sing of disconnection but judged to be normal. Then, the life estimation process is ended.

Contrary, in the step S330, if the maximum value of the temperature data is judged to be shifted, the heater wire 132E is judge a to have the sign of disconnection, and the life alarming process for giving a notice that the heater wire is approaching the end of its life is performed in a step S400. More specifically, as the life alarming process for the heater wire, for example, the alarm means 270, such as a buzzer or the like, is driven, or otherwise a message that the heater wire is nearing the end of its life is displayed on the display means 250. Thereafter, the life estimation process for the heater wire in this application (or batch process) will be ended.

In this way, in the life estimation process shown in FIG. 18, the life of the heater wire 132E, the temperature change of which is the greatest during the carrying-in period, can be estimated more appropriately than conventional, by utilizing the data obtained during the carrying-in period of the wafers W, in which period the sign of disconnection being more likely to be seen than during the stabilized temperature period. Besides, the sign of disconnection can be seen in a significantly earlier period than during the stabilized temperature period, as such the estimation of the life can be performed in a further earlier period than conventional. Thus, preparation for exchanging parts of each heater wire 132A to 132E and the maintenance schedule for the exchange for the heating apparatus 100 can be made with plenty of time.

As with the heater wire 132E which is more likely to show the trend of temperature change as shown in FIG. 18, a significant number of times of applications (i.e., about 160 times in this embodiment) can be performed before the heater wire 132E is actually disconnected after the maximum value of the temperature data thereof during the wafer-carrying-in period was shifted. Therefore, it might be sometimes too early to perform the life alarming process if defining only the shift of the maximum value of the temperature data during the carrying-in period of the wafers W as the judging criterion of the life estimation.

Thus, the inventors have also studied other features that can be regarded as the judging criterion in the temperature change as shown in FIG. 18. As a result, it was found that the maximum value of the temperature data tends to exhibit a constant transition before shifted, while, after shifted, it tends to be lowered, as the heater wire 132E is more approaching the end of the life. Accordingly, if such a lowering tendency of the maximum value of the temperature data can be detected, the end of the life of the heater wire 132E can be appropriately estimated. In fact, in the example shown in FIG. 18, the heater wire 132E was disconnected during an 80th application after the maximum value of the temperature data exhibited such a lowering trend.

Therefore, in the case of estimating the life of such a heater wire 132E, as the criterion or criteria for judging the life estimation, it is preferred not only to provide the judgment on the shift of the maximum value of the temperature data during the carrying-in period of the wafers W but also to make the judgment on the presence or absence of the lowering trend of the maximum value of the temperature data that can be detected after the shift. Namely, after the maximum value of the temperature data exceeded the threshold value, the trend of change of the maximum value of the temperature data detected in each application is further observed, and the life of the heater wire 132E is then estimated based on the result of the observation.

Figure 19:
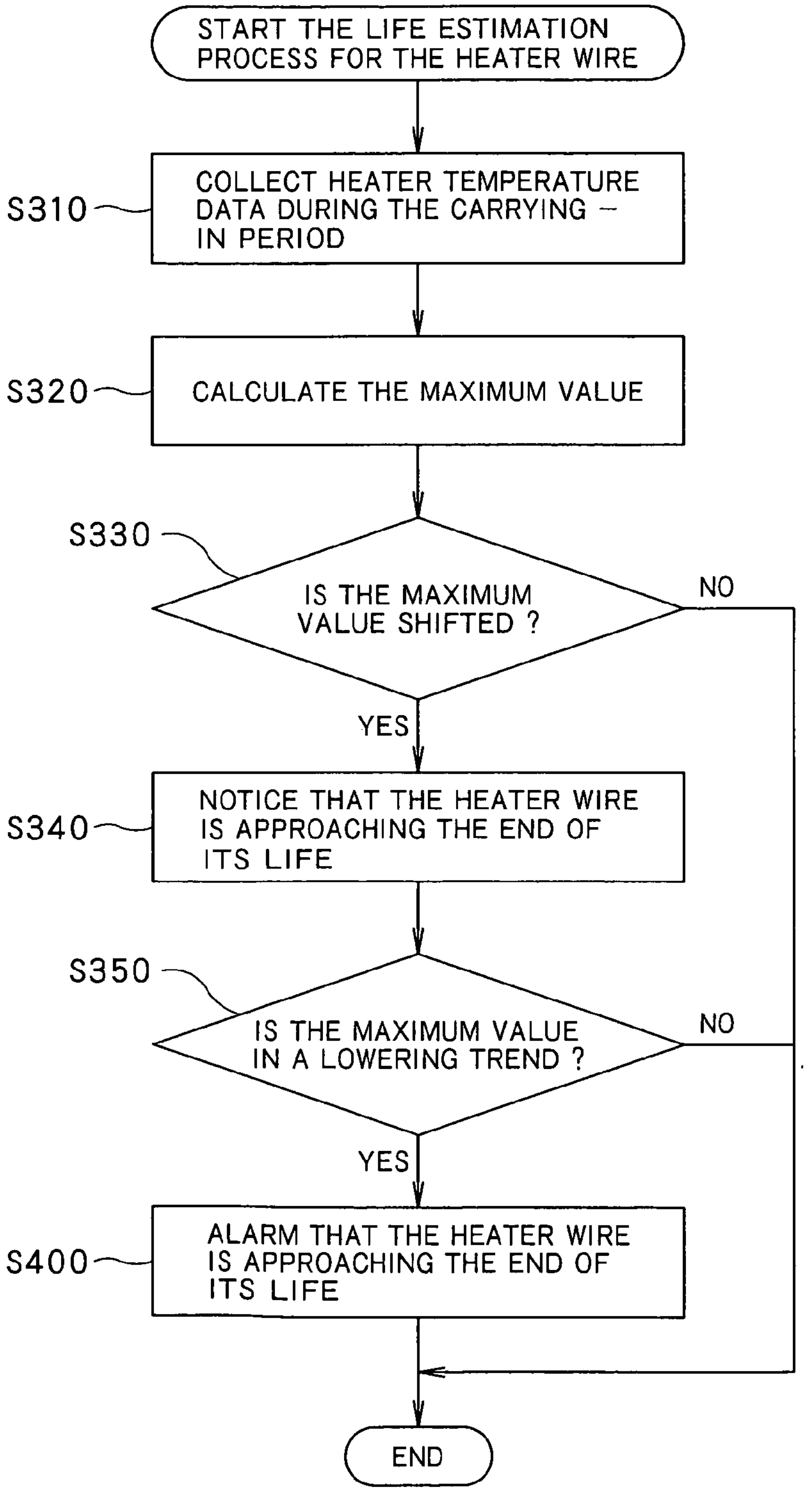
FIG. 19 is a flow chart showing a variation of the life estimation process related to the third embodiment of the present invention.

Specifically, as shown in FIG. 19, when the maximum value of the temperature data is judged to have been shifted in the step S330, only a judgment that there is the sign of disconnection of the heater wire 132E is made. Then, a heater-wire-life noticing process is performed in a step S340 before the heater-wire-life alarming process is performed in the step S400. Namely, in the heater-wire-life noticing process, a notice or indication (e.g., warning) that demonstrates the presence of the sign of disconnection, as a pre-stage, in which the heater wire 132E actually reaches the end of its life, is displayed on the display means 250. In such a manner, if the sign of disconnection of the heater wire 132E can be perceived in an earlier period and the trend of the change can be indicated on the display 250, considerably plenty of time can be provided for preparing the parts for exchange and/or maintenance schedule, thereby achieving efficient exchange of the heater wires.

Thereafter, the presence or absence of the lowering trend of the maximum value of the temperature data is judged in a step S350. For example, an average of changing amounts of the maximum value of the temperature data detected in each application is calculated. As the result, if an average line obtained by plotting each calculated average of the changing amounts descends, the maximum value of the temperature data is judged to be in a lowering trend. More specifically, once the maximum value of the temperature data is detected in a certain application, the average of changing amounts of the maximum values will be obtained, by using the maximum value of the certain application and the maximum values having been obtained in two or three times of the applications just before the certain application. In this case, if the average of changing amounts of the maximum values continues to be lowered over a predetermined number of times or more, the maximum value of the temperature data is judge to be in the lowering trend. By obtaining the average of changing amounts in such a manner, the overall lowering tendency of the maximum value of the temperature data can be grasped even in such a case that the maximum value of the temperature data is temporarily elevated or lowered.

The grasping of such a temperature lowering tendency is not limited to this aspect. For instance, if the maximum value of the temperature data detected in a certain application is lower than the maximum value of the temperature data detected in the application just before the certain application and if such a temperature lowering tendency continues over a predetermined number of times (e.g., eight times or more) of applications, the maximum value of the temperature data can be judged to be in the lowering trend.

In this manner, the presence or absence of the lowering tendency of the maximum value of the temperature data is judged in the step S350. As a result, if the maximum value of the temperature data is not in the lowering trend, while the sign of disconnection of the heater wire 132E is seen, there is less possibility that the disconnection will occur suddenly or before long. Therefore, the life estimation process for the heater wire in this application will be ended.

Contrary, if the maximum value of the temperature data is judged to be in the lowering trend, there is the sign of disconnection of the heater wire 132E, as well as there is possibility that the disconnection will occur suddenly or before long. Therefore, the heater-wire-life alarming process will be performed in the step S400. More specifically, as in the case of the step S400 shown in FIG. 18, the alarm means 270, such as a buzzer or the like, is actuated, or otherwise a message or indication that the heater wire is nearing the end of its life is displayed on the display means 250. Thereafter, the life estimation process for the heater wire in this application (or batch process) will be ended.

As described above, according to the third embodiment, by detecting the maximum values (i.e., each value designated by an arrow in FIG. 16B) of the temperature data detected by the external temperature sensor 136E during the carrying-in period of the wafers W, in which period the sign of disconnection being more likely to be seen than during the stabilized temperature period, the life of the heater wire 132E can be estimated based on the detected values. Because the temperature data detected during the carrying-in period tends to exhibit a greater change as compared with the temperature data detected during the heating period, a more conspicuous sign of disconnection of the heater wire 132E can be seen in the temperature data detected during the carrying-in period. Thus, according to the life estimation process related to the third embodiment, the life of the heater wire 132E can be estimated in an earlier period and more appropriately than conventional.

Furthermore, in the third embodiment, the life of the heater wire 132E is estimated by using the judging criterion based on whether or not the maximum value of the temperature data is shifted up to a certain higher value as well as by using the judging criterion based on whether or not the maximum value of the temperature data exhibits the lowering tendency after the shift. Accordingly, the life estimation for the heater wire 132E can be performed more appropriately. It should be appreciated that, for example, in such a case that the temperature change of the heater wire can directly demonstrate the disconnection within a relatively short period after the shift of the maximum value of the temperature data, the life estimation process for the heater wire 132E may be performed without observing the lowering tendency of the maximum value of the temperature data, as shown in FIG. 17.

Alternatively or additionally, either of the life estimation process as shown in FIG. 17 employing the judging criterion based only on the shift of the maximum value of the temperature data and the life estimation process as shown in FIG. 19 employing the judging criterion based on the presence or absence of the lowering tendency of the maximum value of the temperature data after judging the shift of the maximum value of the temperature data may be optionally selected. In this case, for example, options for selecting these life estimation processes may be added to various options set in the heating apparatus so that the operator can select such options by an input operation via the input/output means.

Figure 20:
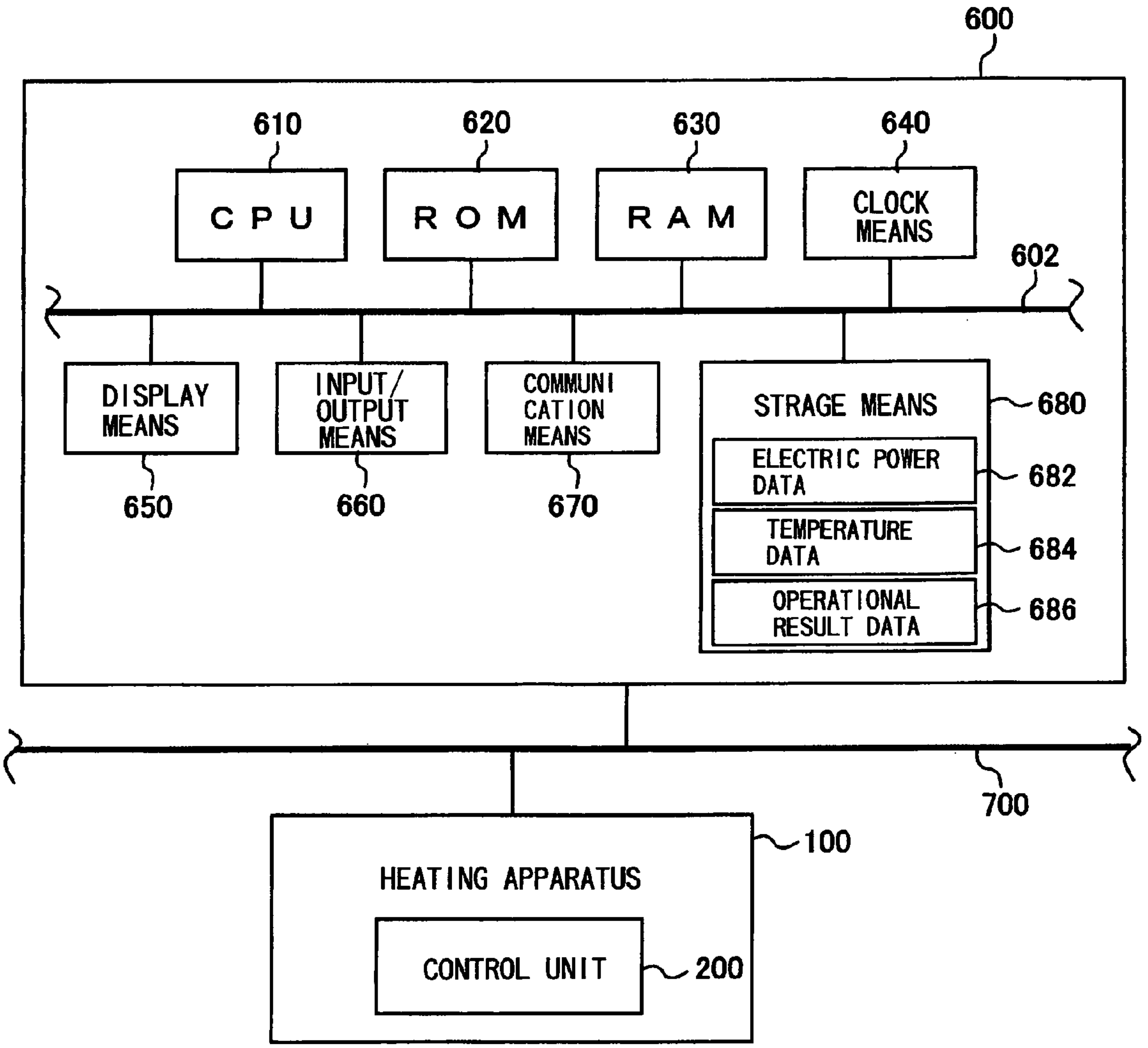
FIG. 20 is a block diagram showing construction of a processing system related to a fourth embodiment of the present invention.

The Life Estimating System for the Heater Wire Related to a Fourth Embodiment Next, the life estimating system for the heater wire related to the fourth embodiment will be described with reference to the drawings. FIG. 20 is a block diagram showing general construction of a processing system which can be applied as the life estimating system related to this embodiment. As shown in FIG. 20, the processing system is composed of the heating apparatus 100, a data processor 600, and a network 700, such as a local area network (LAN), adapted for electrically connecting these apparatuses.

The data processor 600, for example, as shown in FIG. 20, is composed of a CPU 610, a ROM 620 adapted for storing data that the CPU 610 requires to perform a process, a RAM 630 provided with memory areas or the like used for the various data processes performed by the CPU 610, a counter means 640 composed of a counter or the like adapted for counting the time, a display means 650 composed of a liquid crystal display or the like adapted for displaying an operational screen or optional screen, and an input/output means 660 which can perform input of various data and output of the various data to a predetermined storage medium and the like due to the operator.

Additionally, the data processor 600 includes a communication means 670 adapted for transferring the data to the heating apparatus 100 and the like via the network 700, and a storage means 680, such as a hard disk (HDD) or the like, adapted for storing various programs (e.g., operational programs for calculating the pressure data and the like) performed by the CPU 610 and/or other data. Such a data processor 600 is composed of, for example, a computer.

The CPU 610, ROM 620, RAM 630, clock means 640, display means 650, input/output means 660, communication means 670 and storage means 680 are electrically connected with one another via bus lines 602, such as control buses, system buses, data buses and the like.

In the case of performing the life estimation process for the heater wire by using the data processor 600, for example, electric power data 682 with respect to the electric power supplied to each heater wire 132A to 132E from each power source 134A to 134E included in the heating apparatus 100, temperature data 684 obtained from the external temperature sensor 136 and internal temperature sensor 138, and operational result data 686 obtained by performing predetermined calculations by using the electric power data 682 and temperature data 684 due to the CPU 610 are stored in the storage means 680. The operational result data 686 includes, for example, the maximum value and sum of squares of residuals of the electric power data 682 and the maximum value of the temperature data 684. It should be noted that, in the case of performing the life estimation process for the heater wire by using the data processor 600, there is no need for storing the operational result data 286 into the control unit 200 of the heating apparatus 100.

The control unit 200 performs transfer of data to the data processor 600 via the network 700 by using a communication means (not shown) connected with the bus lines 202. Such data communication due to the network 700 is performed based on a communication protocol, such as TCP/IP.

To the network 700, a host computer adapted for centralized control of a plurality of vacuum processing apparatuses including the heating apparatus 100 connected with the network 700 may be separately connected.

In the life estimating system for the heater wire related to the fourth embodiment having such construction, the data processor 600 will perform the life estimation process for the heater wire similar to the aforementioned first to third embodiments, together with the control unit 200 of the heating apparatus 100.

More specifically, the control unit 200 of the heating apparatus 100 performs an electric power data collecting process (corresponding to the steps S110 or S210) and a temperature data collecting process (corresponding to the step S310), and transmits the collected electric power data and/or temperature data to the data processor 600 via the network 700. The data processor 600 then stores the received electric power data and temperature data into the storage means 680. Further, the data processor 600 performs a process, similar to the life estimation process (corresponding to the steps S120 to S140 shown in FIG. 5, steps S220 to S250 shown in FIG. 10, steps S320 to S330 and S400 shown in FIG. 17, or steps S320 to S350 and S400 shown in FIG. 19) for the heater wire performed by the control unit 200 of the heating apparatus 100 in the first to third embodiments, by using the stored electric power data and temperature data, so as to estimate the life of each heater wire 132A to 132E.

In this case, in the life alarming process for the heater wire (e.g., in the step S140, S250 or S400), the notice that the heater wire is approaching the end of its life may be carried out by the data processor 600, or otherwise the notice may also be given through the heating apparatus 100. In addition, as described above, in the life noticing process for the heater wire (e.g., in the step S340), the sign of disconnection of the heater wire may be noticed by the data processor 600, or otherwise the notice the sign of disconnection of the heater wire can be seen may be given through the heating apparatus 100.

For example, in the case of noticing that the heater wire is approaching the end of its life by using the data processor 600 and/or noticing that the sign of disconnection can be seen, such a notice may be displayed by the display means 650 of the data processor 600, or otherwise the alarm means, such as a buzzer (not shown) or the like, may be actuated. Alternatively, in the case of noticing that the heater wire is approaching the end of its life and/or noticing that there is the sign of disconnection of the heater wire by using the heating apparatus 100, the data processor 600 can transmit the estimation result for the heater wire (e.g., the judgment result obtained in the step S130, S240, S330 or S350) to the heating apparatus 100 via the network 700, so as to drive the heating apparatus 100 to perform the displaying process by using the display means 250 or to actuate the alarm means 270, such as a buzzer or the like. Consequently, the operator can obtain information on the life of each heater wire 132A to 132E of the heating apparatus 100.

In this way, according to this embodiment, the control unit 200 of the heating apparatus 100 only collects the electric power data and temperature data, while the life estimation process for the heater wire is substantially performed by the data processor 600. Accordingly, the load imposed on the control unit 200 of the heating apparatus can be significantly reduced.

It should be appreciated that the network 700 may be provided for the connection for only the heating apparatus 100, or otherwise may serve for the connection of a plurality of heating apparatuses including the heating apparatus 100. Alternatively or additionally, other kinds of apparatuses, such as a plasma etching apparatus, a spattering apparatus and the like may be connected with this system. Moreover, not only the processing apparatus adapted for performing a process in a vacuum atmosphere, but also the processing apparatus adapted for performing the process under an atmospheric pressure, such as a film thickness measuring apparatus, may be connected with this system.

Additionally or alternatively, the data processor 600 may be designed as, for example, an advanced group controller (hereinafter, referred to as "an AGC"), so as to perform the life estimation for the heater wire provided in each heating apparatus by using this AGC. In addition to the function for the life estimation for each heater wire as described above, the AGC may be configured to perform centralized control for recipes (or process conditions or the like) of the heating apparatus 100 and/or other processing apparatuses and/or process control for each apparatus. In addition, or alternatively, the AGC may be configured to perform an analytic and/or statistic process for process data obtained from each processor, centralized monitoring for the process data and/or results of the analytic and/or statistic process as well as to perform a process for reflecting the results of the analytic and/or statistic process onto the recipes. This AGC may be composed of a single computer, or may be composed of a plurality of computers. Additionally, the AGC may be designed to separate functions used for a server from those used for a client.

In this manner, by collectively performing the life estimation for each heater wire in the plurality of heating apparatuses by using the data processor 600, the heater wire approaching the end of its life can be readily specified, thus enhancing efficiency of the maintenance. As a result, the operation of each heating apparatus can be restarted in a shorter time.

The invention as detailed above in the first to fourth embodiments can also be achieved, by providing a medium, such as the storage medium or the like, storing therein a software program for effecting the aforementioned functions of these embodiments, into the system or apparatus of interest, and by reading out and performing the program stored in the medium, such as the storage medium or the like, by using the computer (or CPU and/or MPU) of the system or apparatus.

In this case, each function of each embodiment described above will be achieved by the program itself read out from the medium, such as the storage medium or the like, and thus the medium, such as the storage medium or the like, storing the program therein can also be considered as one constituting this invention. As the medium, such as the storage medium or the like, for providing the program, for example, Floppy® disks, hard disks, optical disks, optical magnetic disks, CD-ROMs, CD-Rs, CD-RWs, DVD-ROMs, DVD-RAMs, DVD-RWs, DVD+RWs, magnetic tapes, nonvolatile memory cards, ROMs and the like can be mentioned. Each program can also be provided to the storage medium by downloading it into the medium via the network.

It should be appreciated that the present invention includes not only the case in which each function of each embodiment is achieved by executing each program read out by the computer, but also the case in which a part or all of actual processes are performed by an OS of the like that is operating for the computer, based on an indication of the program, so that each function of the embodiment as described above can be achieved by the processes.

Furthermore, this invention also includes the case in which the program read out by the medium, such as the storage medium or the like, is written into a memory provided in an expanded board inserted in a computer and/or an expanded unit connected with the computer, and a part or all of actual processes are then performed by the CPU or the like provided in the expanded board or expanded unit, based on an indication of the program, so that each function of the embodiment as described above can be achieved by the processes.

As discussed above, while preferred embodiments of this invention have been described with reference to the drawings, the present invention is not limited to these aspects, it should be obvious that numerous variations and modifications will now occur to those skilled in the art without departing from the present invention, and it should be understood that such variations and modifications are also within the scope of the claimed invention.

While the case, in which the present invention is applied to the heating apparatus adapted for providing the heating process to the wafers, has been discussed in the first to fourth embodiments described above, the application is not limited this aspect. For instance, this invention can also be applied to an apparatus provided with the processing chamber, the interior of which can be controlled into a vacuum state, such as the plasma processing apparatus adapted for providing an etching process to the wafers, the plasma CVD apparatus adapted for providing a film forming process to the wafers, the sputtering apparatus or the like. Furthermore, the present invention can also be applied to other substrate processing apparatuses adapted for processing substrates other than the wafers, including FPDs (flat panel displays), mask reticules used for photo-masks and the like, as well as it can be applied to MEMS (micro-electro-mechanical system) manufacturing apparatuses.

INDUSTRIAL APPLICABILITY

The present invention can be applied to the life estimating method for the heater wire of the heating apparatus, heating apparatus, storage medium, and life estimating apparatus for the heater wire, for use in manufacturing semiconductors or the like.

The invention claimed is:

1. A life estimating method for a heater wire of a heating apparatus adapted for elevating a temperature of a substrate in a processing chamber up to a preset heating temperature, controlling the temperature by supplying electric power to the heater wire, and performing a heating process to the substrate after the temperature is elevated to the preset heating temperature, the method comprising the steps of:

obtaining, by a control unit, an index indicative of an amplitude of the electric power supplied to the heater wire during a temperature rising period for elevating the temperature up to the preset heating temperature, the index being a sum of squares of residuals of maximum values and minimum values of the amplitude of the electric power; and giving an alarm notice that the heater wire is approaching an end of life when the index is judged to exceed a preset threshold value.

2. The life estimating method for the heater wire according to claim 1, wherein the threshold value is set, in advance, depending on conditions of the heating process.

3. The life estimating method for the heater wire according to claim 1, wherein the threshold value is set, in advance, depending on the heating temperature and the time required for the temperature rising period.

4. The life estimating method for the heater wire according to claim 1, wherein the threshold value is set, in advance, depending on a temperature rising rate during the temperature rising period.

5. A life estimating method for a heater wire of a heating apparatus adapted for elevating a temperature of a substrate in a processing chamber up to a preset heating temperature, controlling the temperature by supplying electric power to the heater wire, and performing a heating process to the substrate after the temperature is elevated to the preset heating temperature, the method comprising the steps of:

detecting a maximum value of amplitude of the electric power supplied to the heater wire during a temperature rising period for elevating the temperature up to the preset heating temperature;

obtaining, by a control unit, an index indicative of the amplitude of the electric power, the index being a sum of squares of residuals of maximum values and minimum values of the amplitude of the electric power; and giving an alarm notice that the heater wire is approaching an end of life when either the maximum value of the amplitude of the electric power is judged to exceed a preset electric power threshold value, or the index is judged to exceed a preset amplitude threshold value.

6. The life estimating method for the heater wire according to claim 5, wherein at least one of the electric power threshold value, and the amplitude threshold value, is set, in advance, depending on conditions of the heating process.

7. The life estimating method for the heater wire according to claim 5, wherein at least one of the electric power threshold value, and the amplitude threshold value, is set, in advance, depending on the heating temperature and the time required for the temperature rising period.

8. The life estimating method for the heater wire according to claim 5, wherein at least one of the electric power threshold value, and the amplitude threshold value, is set, in advance, depending on a temperature rising rate during the temperature rising period.

9. A heating apparatus comprising:

a processing chamber configured to elevate a temperature of a substrate up to a preset heating temperature, and to perform a heating process to the substrate;

a heater wire provided outside the processing chamber and adapted for generating heat up to a temperature based on electric power supplied from a power source; and a control unit adapted for controlling the electric power supplied from the power source, so as to perform temperature control using the heater wire, wherein the control unit detects a maximum value of amplitude of the electric power supplied to the heater wire during a temperature rising period for elevating the temperature up to the preset heating temperature, obtains an index indicative of the amplitude of the electric power, the index being a sum of squares of residuals of maximum values and minimum values of the amplitude of the electric power, and gives an alarm notice that the heater wire is approaching an end of life, when judging that either the maximum value of the amplitude of the electric power exceeds a preset electric power threshold value, or the index exceeds a preset amplitude threshold value.

10. A non-transitory computer-readable storage medium for storing therein a program for executing a life estimating method for a heater wire of a heating apparatus adapted for elevating a temperature of a substrate in a processing chamber up to a preset heating temperature, controlling the temperature by supplying electric power to the heater wire, and performing a heating process to the substrate after the temperature is elevated to the preset heating temperature, wherein the program is configured to drive a computer to execute the steps of:

detecting a maximum value of amplitude of the electric power supplied to the heater wire during a temperature rising period for elevating the temperature up to the preset heating temperature;

obtaining an index indicative of the amplitude of the electric power, the index being a sum of squares of residuals of maximum values and minimum values of the amplitude of the electric power; and giving an alarm notice that the heater wire is approaching an end of life when either the maximum value of the amplitude of the electric power is judged to exceed a preset electric power threshold value, or the index is judged to exceed a preset amplitude threshold value.

* * * * *